US006847484B2

(12) United States Patent
Damask et al.

(10) Patent No.: US 6,847,484 B2
(45) Date of Patent: *Jan. 25, 2005

(54) METHODS AND APPARATUS FOR GENERATING POLARIZATION MODE DISPERSION

(76) Inventors: Jay N. Damask, 201 W. 89th St., Apt. 3C, New York, NY (US) 10024; Shih-Cheng Wang, 12528 Denhigh Cir., Olney, MD (US) 20832

( * ) Notice: Subject to any disclaimer, the term of this patent is extended or adjusted under 35 U.S.C. 154(b) by 0 days.

This patent is subject to a terminal disclaimer.

(21) Appl. No.: 10/061,897

(22) Filed: Feb. 1, 2002

(65) Prior Publication Data

US 2002/0191285 A1 Dec. 19, 2002

Related U.S. Application Data

(60) Provisional application No. 60/275,914, filed on Mar. 15, 2001.

(51) Int. Cl.[7] .............................................. G02B 27/28
(52) U.S. Cl. ....................... 359/497; 359/499; 398/152; 398/159; 398/161
(58) Field of Search ............................. 359/497, 499; 398/158–159, 161; 385/11

(56) References Cited

U.S. PATENT DOCUMENTS

| 4,341,442 A | 7/1982 | Johnson |
| 5,430,795 A | 7/1995 | Taga et al. |
| 5,473,457 A | 12/1995 | Ono |

(List continued on next page.)

FOREIGN PATENT DOCUMENTS

| WO | WO 99/53363 A2 | 10/1999 |
| WO | WO 00/03505 A1 | 1/2000 |
| WO | WO 00/13056 A2 | 3/2000 |
| WO | WO 00/36459 A1 | 6/2000 |
| WO | WO 00/65404 A1 | 11/2000 |
| WO | WO 01/40831 | 6/2001 |
| WO | WO 01/48957 | 7/2001 |
| WO | WO 01/61303 | 8/2001 |
| WO | WO 01/61385 | 8/2001 |

OTHER PUBLICATIONS

Betti et al., "Phase Noise and Polarization State Insensitive Optical Coherent Systems," Journal of Lightwave Tech., vol. 8, No. 5, at 756–76 (May 1990).

Bulow, "Operation of Digital Optical Transmission System with Minimal Degradation Due to Polarisation Mode Dispersion," Electronics Letters, vol. 31, No. 3, at 214–15, (Feb. 2, 1995).

(List continued on next page.)

Primary Examiner—Mark A. Robinson
Assistant Examiner—Lee Fineman
(74) Attorney, Agent, or Firm—Brett Alten

(57) ABSTRACT

Methods and apparatus for coherent polarization mode dispersion generation are provided. A generator can include at least four birefringent stages. The birefringent stages are in optical series, and each includes a differential group delay ("DGD") element. The intermediate stages' DGD elements are harmonic. Also, these intermediate stages each include a phase-shifting element. The generator can also include a polarization mode-mixing apparatus and a variable phase-shifting apparatus. The mode-mixing apparatus is capable of inducing polarization mode-mixing between at least one pair of adjacent stages to generate DGD and second order PMD independently at at least one optical frequency. The variable phase-shifting apparatus can include a phase-shifting controller coupled to each of said phase-shifting elements. A graphical user interface for PMD emulation, a PMD compensator for reducing PMD impairment, and calibration methods are also provided.

52 Claims, 17 Drawing Sheets

U.S. PATENT DOCUMENTS

| | | | |
|---|---|---|---|
| 5,587,827 | A | 12/1996 | Hakimi et al. |
| 5,600,738 | A | 2/1997 | Bergland et al. |
| 5,659,412 | A | 8/1997 | Hakki |
| 5,793,511 | A | 8/1998 | Bulow |
| 5,796,510 | A | 8/1998 | Yao |
| 5,822,100 | A | 10/1998 | Robinson et al. |
| 5,859,939 | A | 1/1999 | Fee et al. |
| 5,930,414 | A | 7/1999 | Fishman et al. |
| 5,978,125 | A | 11/1999 | Yao |
| 6,011,253 | A | 1/2000 | Hakki |
| 6,104,515 | A | 8/2000 | Cao |
| 6,130,766 | A | 10/2000 | Cao |
| 6,271,952 | B1 | 8/2001 | Epworth |
| 6,282,333 | B1 | 8/2001 | Dultz et al. |
| 6,359,681 | B1 * | 3/2002 | Housand et al. ............ 356/4.01 |
| 6,542,650 | B2 * | 4/2003 | Khosravani et al. .......... 385/11 |
| 2002/0015547 | A1 * | 2/2002 | Patel ........................... 385/11 |

OTHER PUBLICATIONS

Bulow, "Limitation of Optical First–Order PMD Compensation," OFC/IOOC '99 Technical Digest, vol. 2, at 74–76 (Feb. 1999).

Bulow et al., "PMD Mitigation at 10Gbits/s Using Linear and Nonlinear Integrated Electronics Equalizer Circuits," Electronic Letters, vol. 36, No. 2, at 163–64, (Jan. 20, 2001).

Bulow et al., "Electronic Equalization of Fiber PMD–Induced Distortion at 10Gbits/s" OFC '98 Technical Digest, at 151–52, (Feb. 1998).

Cariall et al., "Electronic Compensation of PMD and Chromatic Dispersion with an IC in Gbits/s Transmission System," Electronics Letters, vol. 36, No. 10 at 889–91, (May 11, 2000).

Chbat, "Mitigation of Polarization Mode Dispersion" LEOS '99, vol. 1, at 151–52, (Nov. 1999).

Chbat et al., "Long Term Field Demonstration of Optical PMD Compensation on an Installed OC–192 Link," OFC/IOOC '99 Technical Digest, vol. Suppliement, at 12–1/12–3, (Feb. 1999).

Chen, "System Impairment Due to Polarization Mode Dispersion," OFC/IOOC '99 Technical Digest, vol. 2, at 77–79, (Feb. 1999).

Chiba et al., "Polarization Stabilizer Using Liquid Crystal Rotatable Waveplates," Journal of Lightwave Technology, vol. 17, No. 5, at 885–890, (May 1999).

Chowdury et al., Measurment of Dispersion Compensating Module Polarization–Mode Dispersion Statistics, OFC '97, at 160–61, (1997).

Evans, "The Birefringent Filter," Journal of the Optical Society of America, vol. 39, No. 3, at 229–42 (Mar. 1949).

Fini et al., "Accumulation of Polarization–Mode Dispersion in Cascades of Compensated Optical Fibers," IEEE Photonics Technology Letters, vol. 13, No. 2, at 124–26, (Feb. 2001).

Gisin et al., "Polarization Mode Dispersion: Time Verses Frequency Domains," Optics Communications, vol. 89, Nos. 2, 3, 4 at 316–23, (May 1992).

Glingener et al., "Polarization Mode Dispersion Compensation at 20 Gb/s with a Compact Distributed Equalizer In LiNbO3," OFC/IOOC '99 Technical Digest, vol. Supplement at PD29/1–PD29/3 (Feb. 1999).

Hakki, "Polarization Mode Dispersion Compensation By Phase Diversity Detection," IEEE, Photonics Technology Letters, vol. 9, No. 1, at 121–23 (Jan. 1997).

Harris et al., "Optical Network Synthesis Using Birefringent Crystals. *I. Synthesis of Lossless Networks of EqualLength Crystals," Journal of the Optical Society of America, vol. 54, No. 10, at 1267–79 (Oct. 1964).

Helsmann, "Tutorial: Polarization Mode Dispersion: Fundamentals and Impact on Optical Communications Systems," ECOC '98, vol. Supplement, at 51–79 (Sep. 1988).

Helsmann et al., "Automatic Compensation of 1st Order Polarization Mode Dispersion in a 10 Gb/s Transmission System," ECOC '98, vol. 1 at 529–30 (Sep. 1998).

Hinz et al., "Polarization Mode Dispersion Compensation for 6ps, 40 Gbit/s Pulses Using Distributed Equalizer in LiNbO3," Electronics Letters, vol. 35, No. 14 at 1185–86 (Jul. 8, 1999).

Ishikawa et al., 40–Gbit/s Transmission Over High PMD Fiber with Automatic PMD Compensation, APCC/OECC '99, vol. 1 at 424–27 (Oct. 1999).

Kikuchi "Analysis of Signal Degree of Polarizaton Degradation Used as Control Signal for Optical PMDC," Journal of Lightwave Technology, vol. 19, No. 4 at 480–86 (Apr. 2001).

Kudou et al., "Theoretical Basis of Polarization Mode Dispersion Equalization Up to the 2nd Order," Journal of Lightwave Technology, vol. 18, No. 4, 614–17 (Apr. 2000).

Lee et al., Adjustable Compensation of Polarization Mode Dispersion Using a High–Birefrngence–Nonlinearly Chirped Fiber Bragg Grating, IEEE Photonics Technolgoy Letters, vol. 11, No. 10 at 1277–79 (Oct. 1999).

Mollar, "Filter Synthesis for Braodband PMD Compensation in WDM Systems," IEEE Photonics Technology Letters, vol. 12, No. 9 at 1258–60 (Sep. 2000).

Moller et al., "Spectral Resolved PMD Vector Monitoring Using a Scanning Fabry–Perot Filter and a Polarimeter," LEOS (Laser and Electro–Optics Society) '00–13th Annual/IEEE vol. 1, No. TuJ4 at 220–221 (Nov. 13–16, 2000).

Noe et al., "Polarization Mode Dispersion Compensation at 20 Gb/s with Fiber–Based Distribution Equalizer," http://ont.uni–paderborn.de/publikationen/ELPM9820.html,at 1–5 (viewed and printed Feb. 8, 2001).

Noe et al., "Fiber–Based Distribution PMD Compensation at 20 GB/s," ECOC '98, vol. 3 at 157–58 (Sep. 1998).

Noe et al., "Integrated Optical LiNbO3 Distributed Polarization Mode Dispersion Compensator in 20 Gbit/s Transmission System," Electronic Letters, vol. 35, No. 8 at 652–54 (Apr. 15, 1999).

Ozekl et al., "Polarization Mode Dispersion Equalization Experiment Using a Variable Equalizing Optical Circuit Controlled by a Pulse–Waveform Comparison Algorithm," OFC '94 Technical Digest at 62–64 (Nov. 4, 1994).

Patcher et al., "Component for 2nd Order Compensation of Polarization Mode Dispersion," Electronic Letters, vol. 33, No. 13 at 1157–59 (Jun. 19, 1997).

Pua et al., "An Adaptive 1st Order Polarization Mode Dispersion Compensation System Aided by Polarization Scrambling: Theory and Demonstration," Journal of Lightwave Technology, vol. 18, No. 6 at 832–41 (Jun. 2000).

Roy et al., "A Simple Dynamic Polarization Mode Dispersion Compensator," OFC/IOOC '99 Technical Digest, vol. 1, at 275–78 (Feb. 1999).

Sandel et al., "Optical Polarization Mode Dispersion Compensation of 2.4 bit Durations of Differential Group Delay at 40 Gbit/s," Electronic Letters, vol. 35, No. 16 at 1365–67 (Aug. 5, 1999).

Sandel et al., "Automatic Polarisation Mode Dispersion Compensation in 40 Gbit/s Optical Transmission System," Electronics Letters, vol. 34, No. 23 at 2258–59 (Nov. 12, 1998).

Shtiaf et al., A Compensator for the Effects of High–Order Polarization Mode Disperison in Optical Fibers,: IEEE Photonics Technology Letters, vol. 12, No. 4 at 434–36 (Apr. 2000).

Sobiski et al., "Fast 1st Order PMD Compensation with Low Insertion Loss fo 10 Gbits/s System," Electronics Letters, vol. 37, No. 1 at 46–48 (Jan. 4, 2001).

Takahashi et al., "Automatic Compensation Techniques for Timewise Fluctuating Polarization Mode Dispersion in In–Line Amplifier Systems," Electronics Letters, vol. 30, No. 4 at 348–49 (Feb. 17, 1994).

Watley et al., "Field Evaluation of an Optical PMD Compensator Using an Installed 10 Gbit/s System," OFC '00, vol. 3, No. ThB6 at 37–39 (Mar. 2000).

Winters et al., "Experimental Equalization of Polarization Dispersion," IEEE Photonics Technology Letters, vol. 2, No. 8 at 591–93 (Aug. 1990).

Winters ry al., "Adaptive Nonlinear Cancellation for High–Speed Fiber–Optic Systems," Journal of Lightwave Technology, vol. 10, No. 7 (Jul. 1992).

* cited by examiner

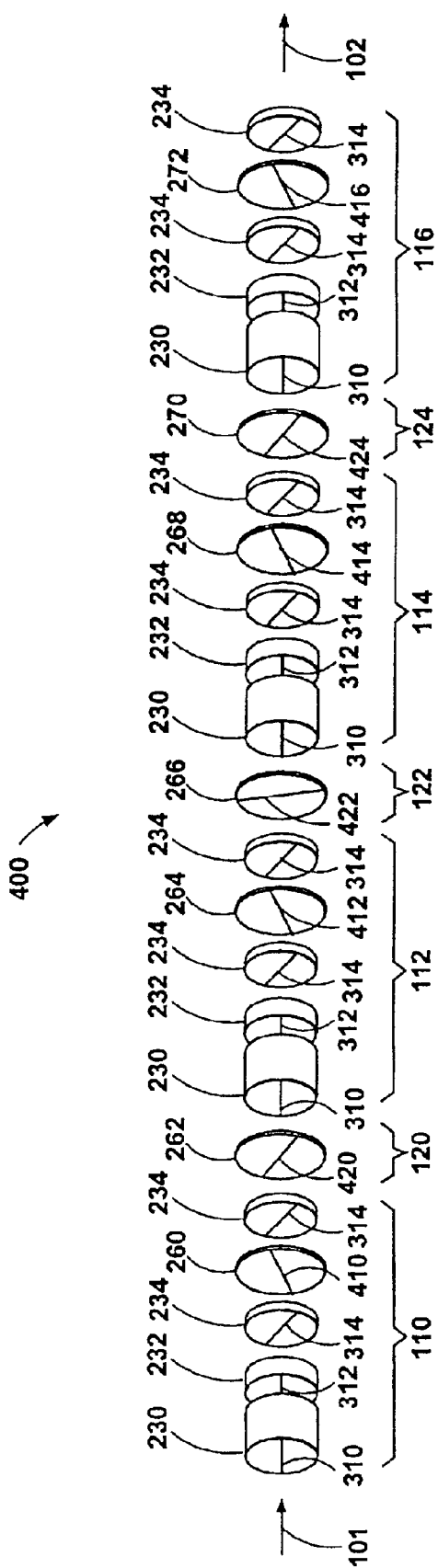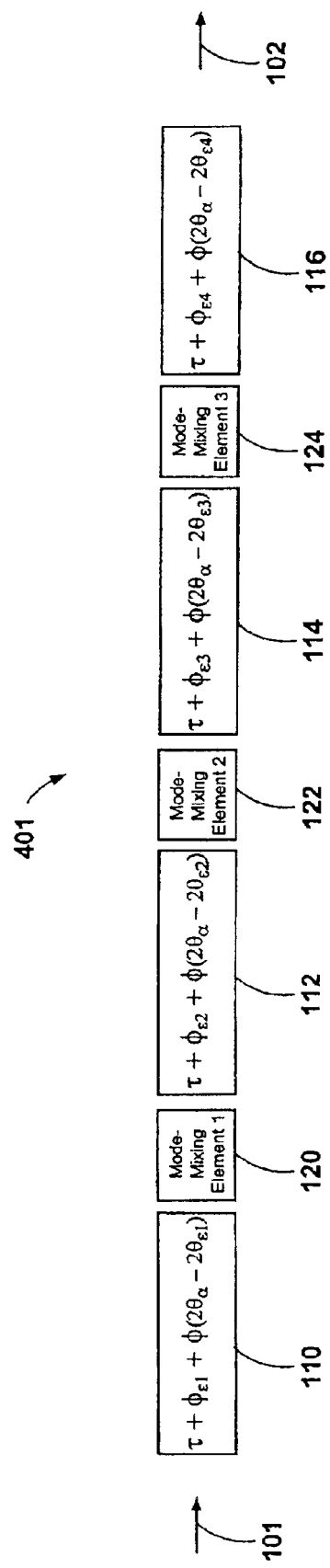
FIG. 4A
FIG. 4B

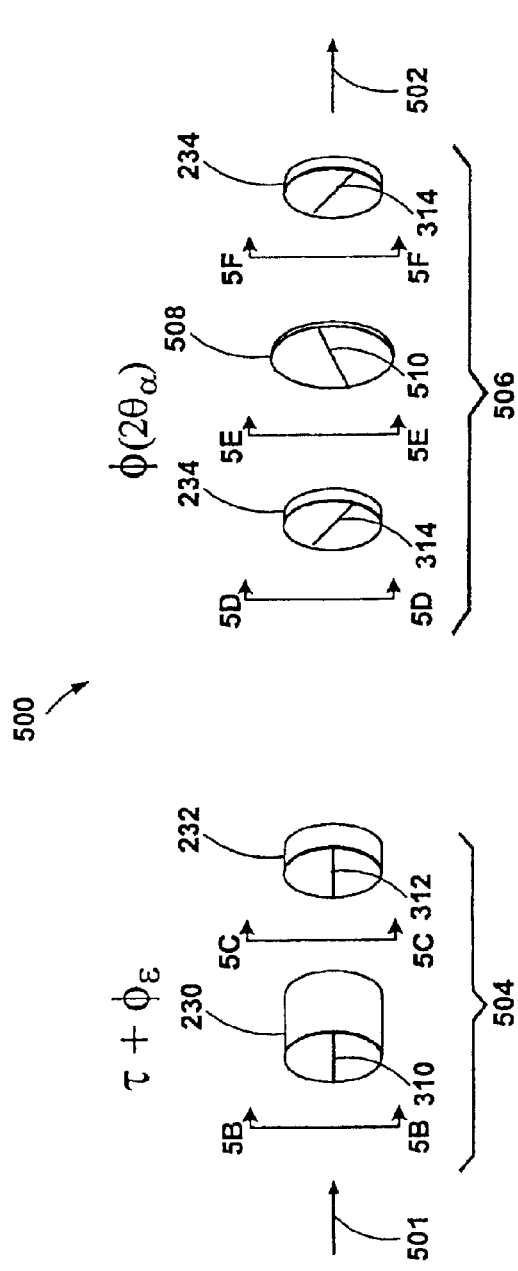
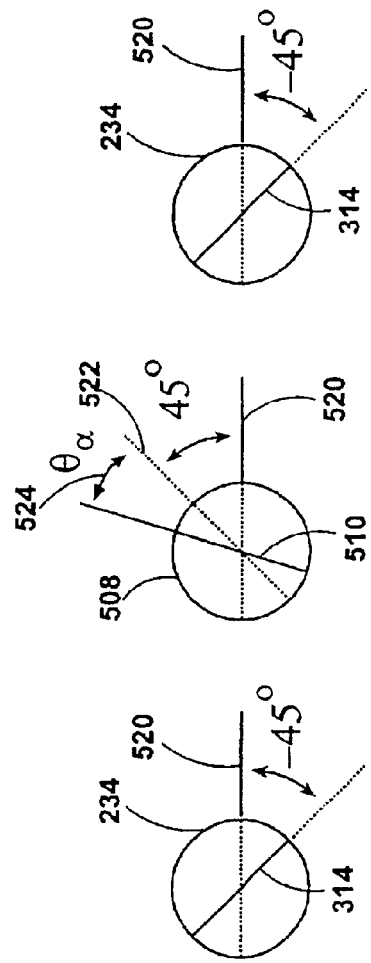
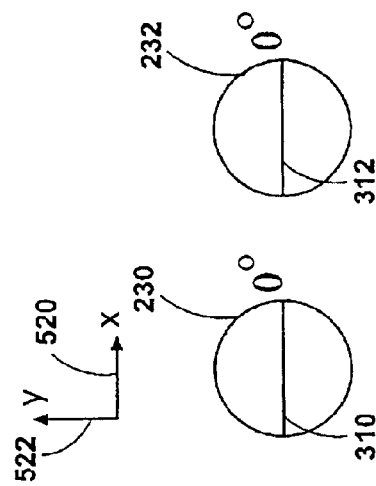

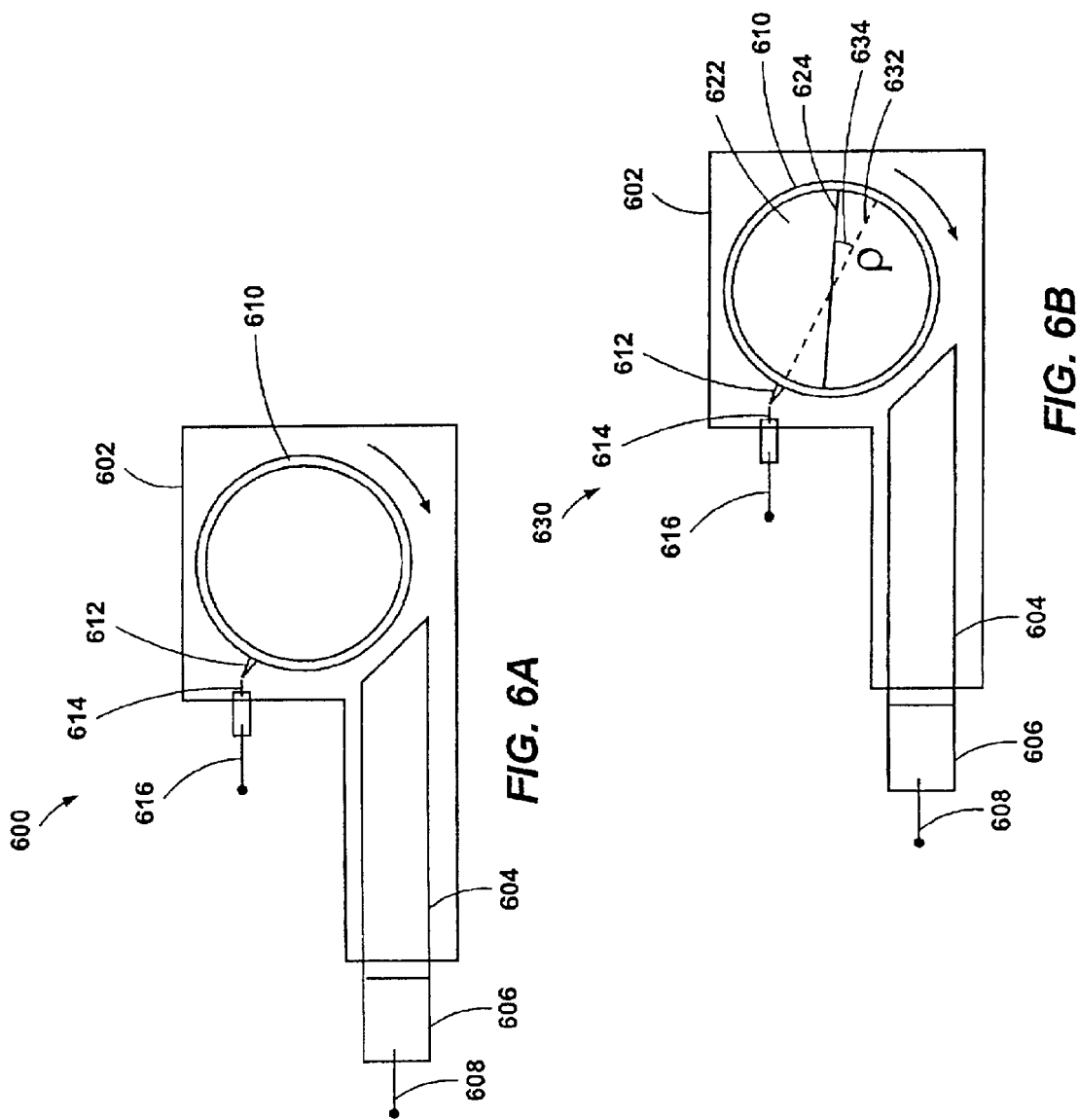

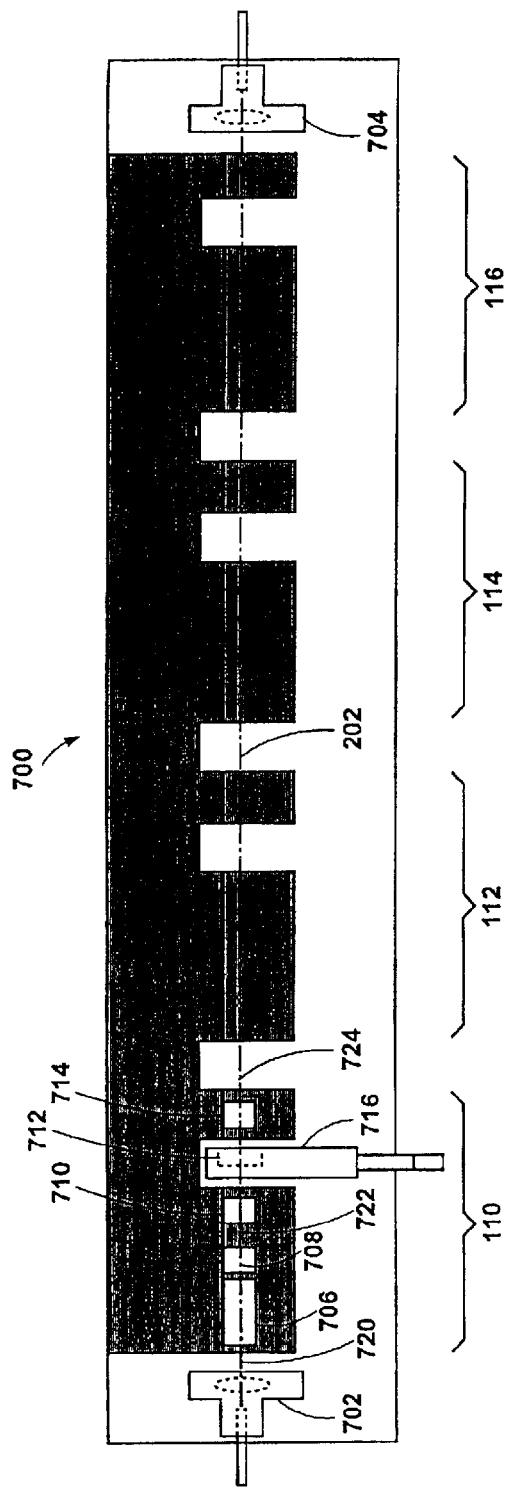
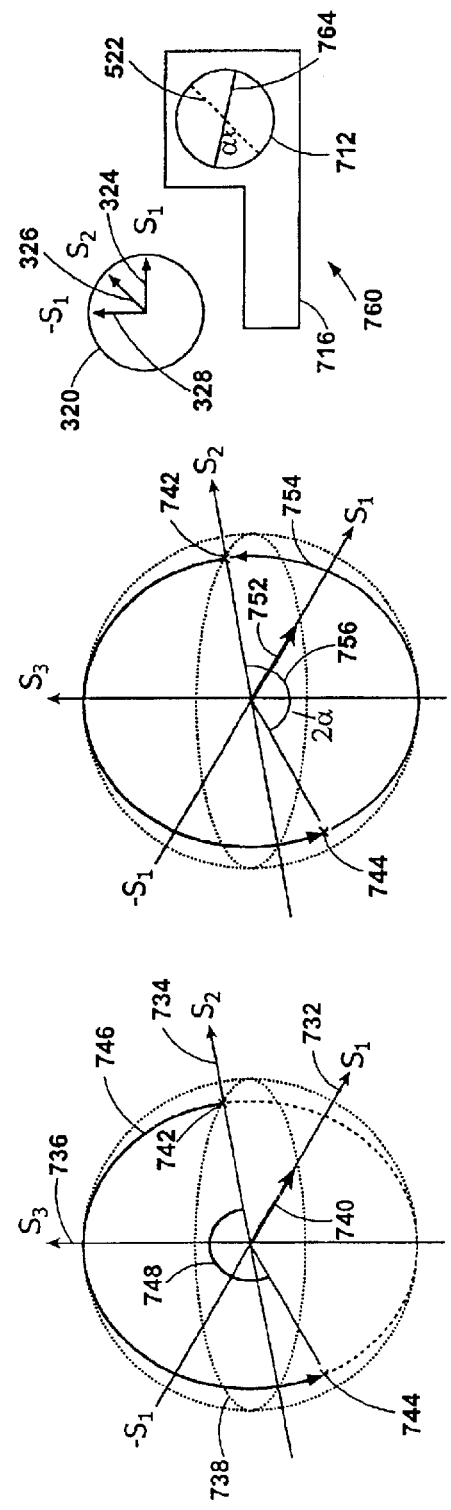
FIG. 7A
FIG. 7B
FIG. 7C
FIG. 7D

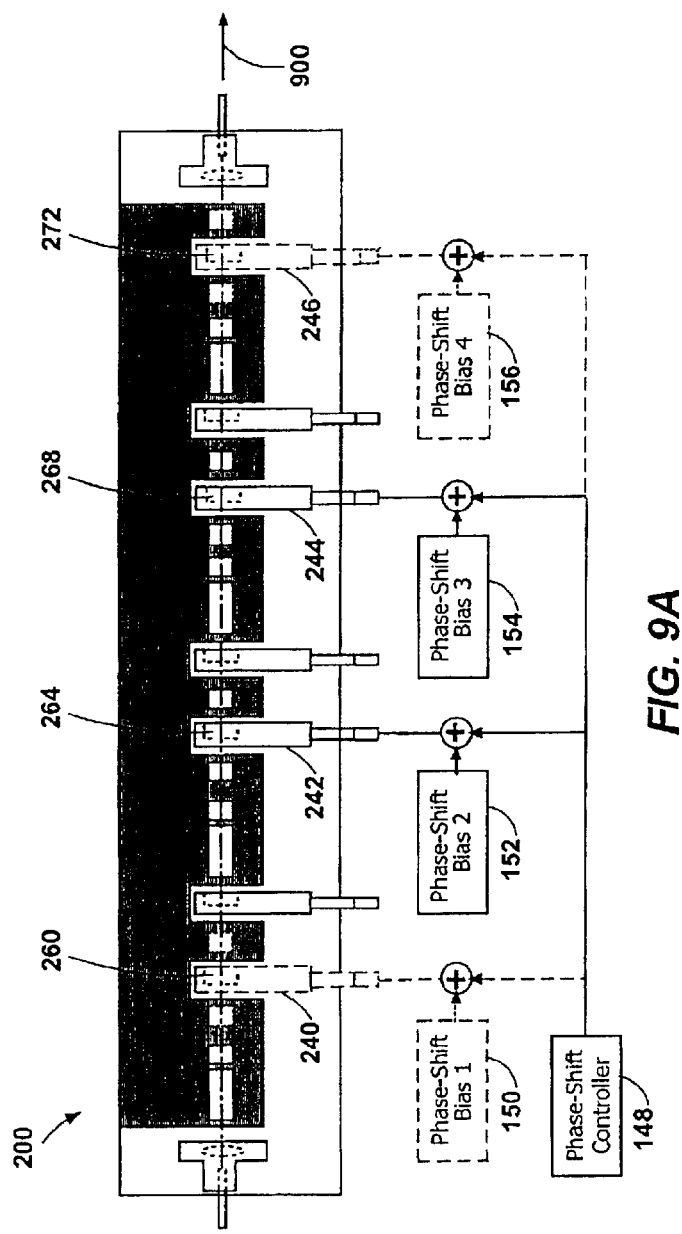
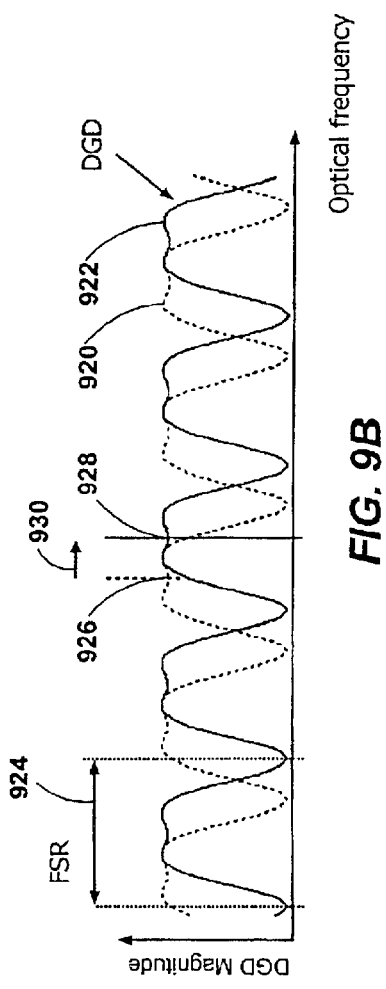
FIG. 9A
FIG. 9B

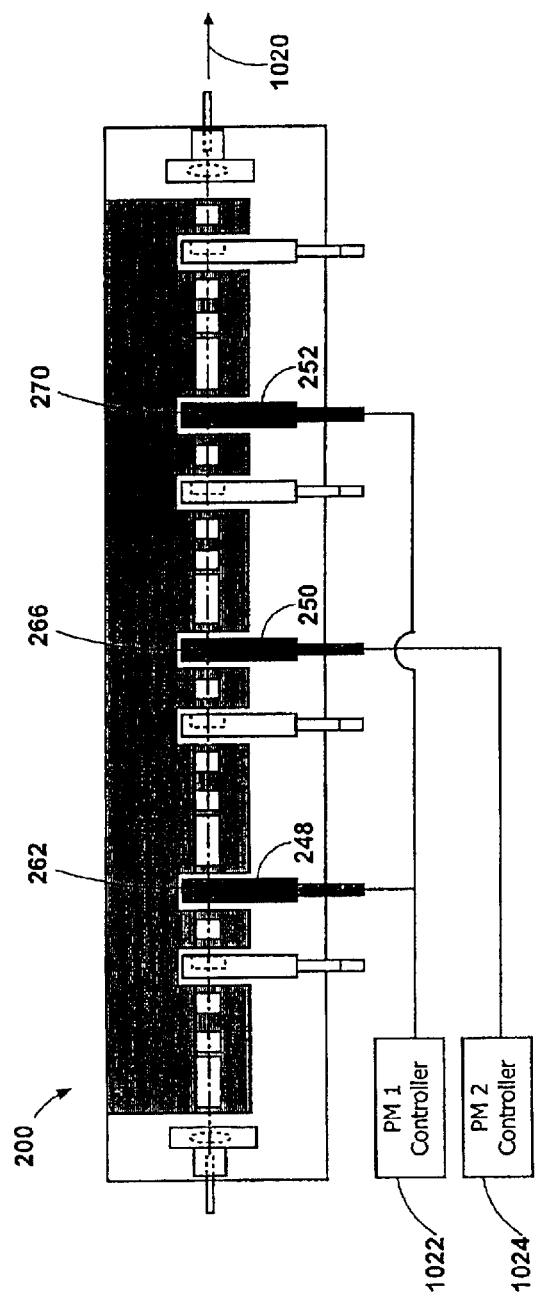
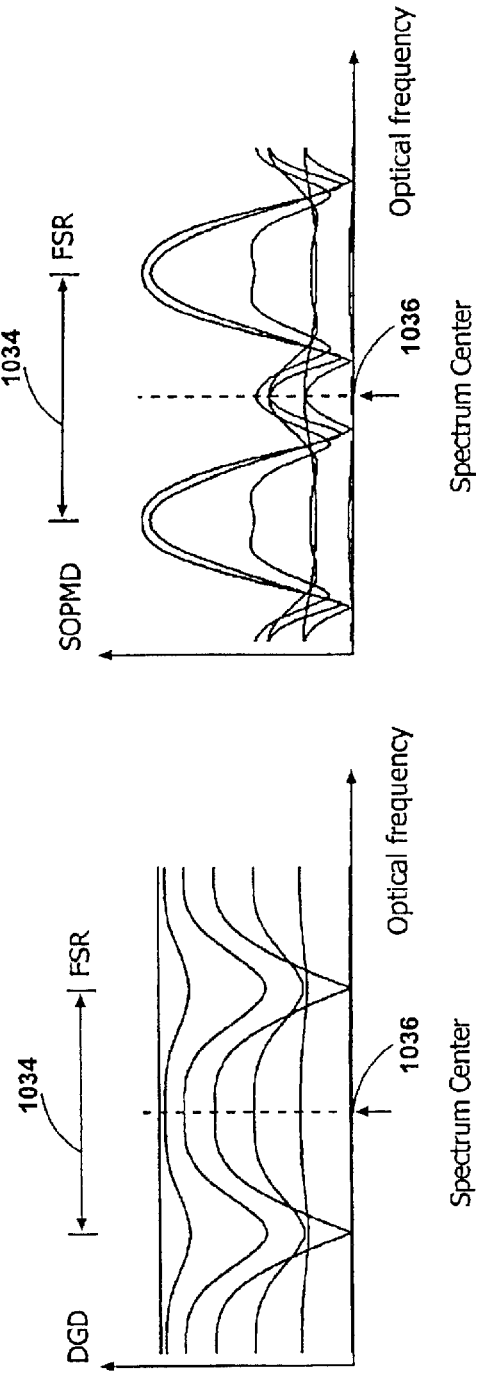
FIG. 10A
FIG. 10B
FIG. 10C

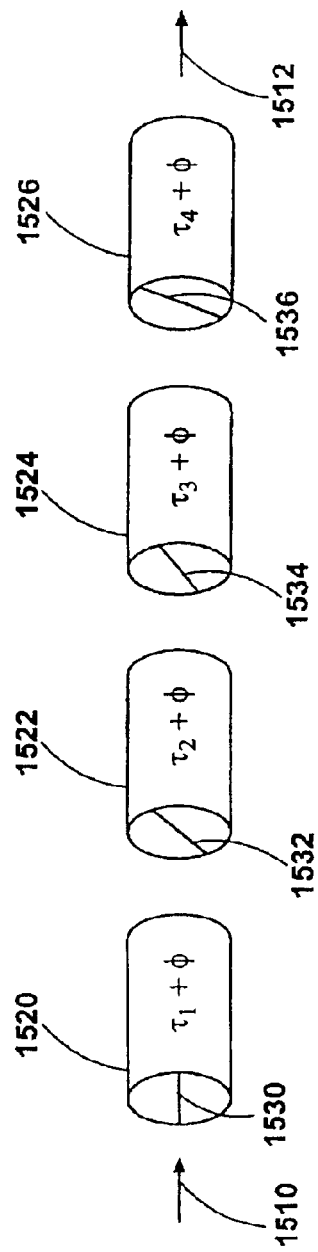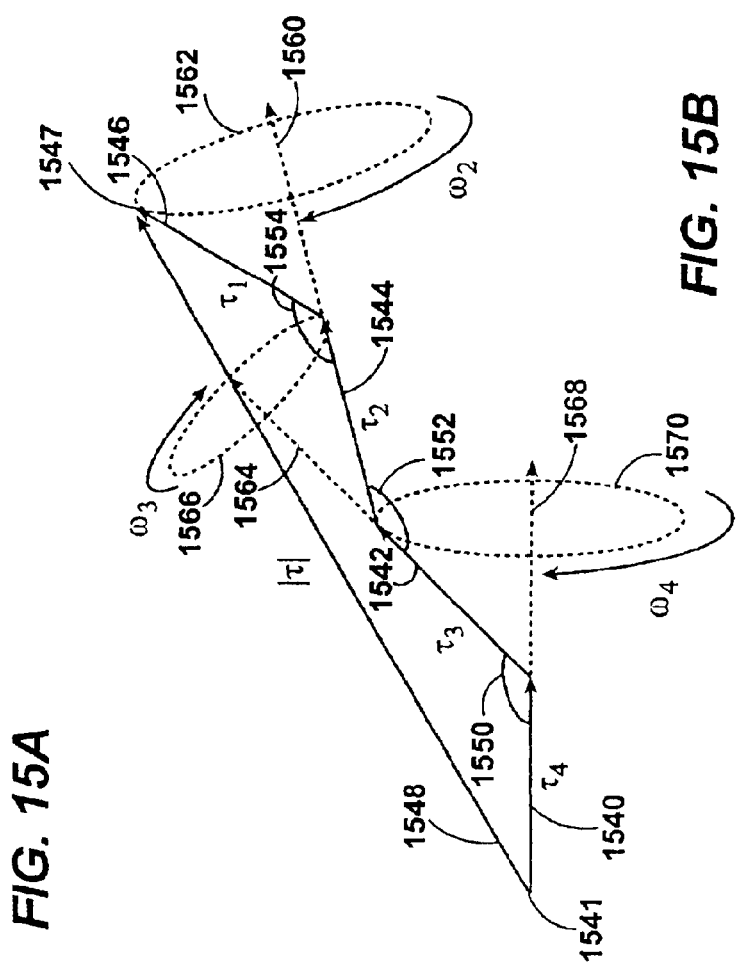

METHODS AND APPARATUS FOR GENERATING POLARIZATION MODE DISPERSION

CROSS-REFERENCE TO RELATED APPLICATIONS

This application claims the benefit of U.S. Provisional Patent Application No. 60/259,913 filed Jan. 5, 2001 and U.S. Provisional Patent Application No. 60/275,914 filed Mar. 15, 2001, both of which are hereby incorporated by reference in their entireties.

FIELD OF THE INVENTION

This relates to the controlled generation of polarization mode dispersion, particularly to the generation of differential group delay, depolarization, polarization dependent chromatic dispersion, and higher orders of polarization mode dispersion in a controllable and predictable manner, especially for emulation and compensation purposes.

BACKGROUND OF THE INVENTION

Polarization mode dispersion (hereinafter, "PMD") is an optical property that can be generated by a concatenation of two or more birefringent elements. PMD can be a significant impairment in high data-rate optical communication systems when the transmission medium is optical fiber. Data transmission rates that are effected by the PMD of optical fiber are typically 10 Gbps, 40 Gbps, and higher.

Optical fiber can exhibit PMD because of imperfections within the fiber, which induce localized birefringence. When the transmission path is long, these localized birefringent sections can combine to yield a particularly complicated polarization-dependent effect. These localized sections are known to result, for example, from eccentricities of the waveguide's core, micro-bubbles in the waveguide core and/or cladding, and strain gradients through the fiber cross-section. Mechanical stress on the fiber resulting from cabling and installation can also cause the fiber to suffer stress-induced birefringence. Environmental changes experienced by a fiber can be dynamic and statistical in nature, and are believed to result in PMD changes that can last for variable periods of time and vary with wavelength, with the potential for prolonged degradation of data transmission.

In the laboratory and the field, there are reasons to artificially generate PMD in a controlled fashion.

In the laboratory, for example, a PMD emulator is desirably used to predictably and repeatably add PMD to signals generated by optical transmitters for testing optical receivers. In many cases, however, the center frequency of the optical signal being tested may not be properly aligned with the PMD spectrum generated by the emulator. Because a conventional PMD emulator cannot controllably "frequency shift" its spectrum to accommodate for the misalignment, those attempting to evaluate the PMD response of receivers and other equipment are generally forced to test undesirable and unpredictable PMD states. Often, PMD emulators include ten or more birefringent sections.

A PMD generator can also be incorporated into a specialized telecommunications sub-system called a PMD compensator. PMD compensators are used to mitigate the deleterious effects of PMD imparted on an optical data signal transmitted through an optical fiber. In contrast to PMD emulators, PMD compensators generally include only one or two birefringent sections, but such a small number of sections greatly limits the range of achievable PMD states. In order to achieve a greater operating range, it may be desirable to use PMD compensators that include more than two birefringent generator sections. Unfortunately, PMD spectra generated with more than two sections are difficult to control, subject to misalignment, and are typically frequency dependent.

In some cases, PMD can deleteriously reshape propagating optical pulses, and the degree and type of reshaping can depend on the type of PMD impairment. Generally, impairment includes two such types: first order PMD and second order PMD.

First order PMD is commonly referred to as differential group delay (hereinafter, "DGD"), and more particularly, as the DGD at a small frequency bandwidth. Pure first order PMD can be generated by a single homogenous birefringent medium.

Second order PMD has two parts: polarization-dependent chromatic dispersion (hereinafter, "PDCD") and depolarization. PDCD is the mathematical derivative of DGD with respect to frequency. Depolarization relates to a change of the Stokes PMD parameters with frequency.

Pure first and second order PMD (i.e., the case in which the second-order PMD only includes depolarization) can be generated using a concatenation of two birefringent sections. Higher orders of PMD can introduce curvature of the DGD spectrum, and complicated contortions of the Stokes PMD parameters, with respect to frequency. In contrast to the generation of pure first and second order PMD, which only uses two birefringent sections, higher orders of PMD can be generated using three or more birefringent sections.

DGD, depolarization, PDCD, and other higher orders of PMD can impair optical data transmission in characteristic ways. To analyze the degree to which PMD impairs an optical signal, predictable and repeatable generation of the individual PMD components is desirable. Thus, as mentioned above, PDCD and higher order PMD components can be generated using three or more birefringent stages.

A PMD generator that can predictably access the plurality of PMD components may still not possess maximum utility. PDCD and higher PMD orders can exhibit frequency dependence. As such, a spectrum, for example a PDCD spectrum, has a shape determined by the particular construction and settings of the generator. At some frequencies the spectrum may be at a minimum or maximum, and at other frequencies the spectrum may change quickly. Some PMD generators can produce PMD spectra that are substantially periodic with optical frequency, regardless of the particular spectral shape. Generally, the period of a spectrum is larger than the bandwidth of an optical data signal.

In order to more completely measure the PMD impairment of an optical data signal, the signal should experience all segments of an artificially generated PMD spectrum. One method to measure signal impairment across all segments of an artificially generated PMD spectrum is to tune the frequency of the optical signal. Another method to measure signal impairment across all segments of an artificially generated PMD spectrum is to shift in frequency the PMD spectrum while maintaining the shape of the PMD spectrum intact. Generally, both methods can produce similar results, but the more useful method depends on the experimental setup.

It would therefore be desirable to provide methods and apparatus for generating PMD, and in particular DGD, depolarization, PDCD, and higher order PMD in a controllable, predictable, and reliable way.

It would also be desirable to provide methods and apparatus that are capable of frequency shifting a PMD spectrum while preserving its shape.

It would also be desirable to provide methods and apparatus for compensating PMD impairment.

It would also be desirable to provide methods and apparatus for generating PMD for PMD characterization purposes.

SUMMARY OF THE INVENTION

It is therefore an object of the present invention to provide methods and apparatus for generating PMD, and in particular DGD, depolarization, PDCD, and higher order PMD in a controllable, predictable, and reliable way.

It is also an object of this invention to provide methods and apparatus that are capable of frequency shifting a PMD spectrum while preserving its shape.

It is a further object of this invention to provide methods and apparatus for compensating PMD impairment.

It is another object of this invention to provide methods and apparatus for generating PMD for PMD characterization purposes.

Thus, in accordance with this invention, a coherent polarization mode dispersion generator for generating a coherent PMD spectrum is provided. The generator includes at least four birefringent stages, and optionally a polarization mode-mixing apparatus and a variable phase-shifting apparatus. The birefringent stages are in optical series and form at least three pairs of adjacent stages. Each of the stages includes a differential group delay element. The differential group delay elements within the intermediate stages are harmonic. Each of the intermediate stages also includes a phase-shifting element. It will be appreciated, however, that the first and last stages of the generator may also include phase-shifting elements and that the differential group delay elements of those stages may also be harmonic.

The polarization mode-mixing apparatus is capable of inducing polarization mode-mixing between at least one of the pairs of adjacent stages to generate DGD and second order PMD independently at at least one optical frequency. A variable phase-shifting apparatus includes a phase-shifting controller that can be coupled to at least one, and preferably all of the phase-shifting elements.

According to another aspect of this invention, a method for controlling a coherent PMD generator including a graphical user interface that maps desirable PMD spectra into angles is also provided. The PMD generator includes multiple stages, including at least two intermediate stages, each of which has at least one phase-shifting element having a birefringent axis that can be rotated to phase-shift the PMD spectrum. As mentioned above, however, the first and last of these stages need not include phase-shifting elements. The method includes providing a user an ability to graphically select a PMD spectrum by making a PMD coordinate selection.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4A shows a perspective view of an illustrative combination of optical elements along optical path taken by an optical beam as it propagates toward the output to become an output optical beam according to this invention;

FIG. 4B shows schematic functional block diagram associated with the combination shown in FIG. 4A according to this invention;

FIG. 5A shows a perspective view of an illustrative birefringent stage with an input optical beam and an output optical beam according to this invention;

FIG. 5B is an elevational view of a first optical element converter body of FIG. 5A, taken from line 5B—5B of FIG. 5A according to this invention;

FIG. 5C is an elevational view of a second optical element converter body of FIG. 5A, taken from line 5C—5C of FIG. 5A according to this invention;

FIG. 5D is an elevational view of a third optical element converter body of FIG. 5A, taken from line 5D—5D of FIG. 5A according to this invention;

FIG. 5E is an elevational view of a fourth optical element converter body of FIG. 5A, taken from line 5E—5E of FIG. 5A according to this invention;

FIG. 5F is an elevational view of a fifth optical element converter body of FIG. 5A, taken from line 5F—5F of FIG. 5A according to this invention;

FIG. 6A shows an elevational view of an illustrative rotary stage, which includes apparatus for measured rotation and calibration according to this invention;

FIG. 6B shows an illustrative orientation of a waveplate on a gear according to this invention;

FIG. 7A shows a simplified top planar view of an illustrative embodiment of a PMD generator according to this invention;

FIG. 7B illustrates a Stokes space representation of the polarization transformation that takes place during beam propagation through crystals according to this invention;

FIG. 7C illustrates a Stokes space representation of the polarization state evolution through waveplates shown in FIG. 7A according to this invention;

FIG. 7D illustrates a Stokes space representation of the polarization state evolution that results from the rotation of a waveplate according to this invention;

FIG. 9A shows a top planar view of an illustrative PMD generator, including optional phase-shifting elements in the first and last stages, with a schematic representation of a variable phase-shifting apparatus for operating the generator according to this invention;

FIG. 9B shows illustrative DGD spectra generated on the output beam shown in FIG. 9A as a function of optical frequency according to this invention;

FIG. 10A shows another illustrative PMD generator with an optical output beam and two polarization mode-mixing controllers to operate the generator according to this invention;

FIG. 10B shows seven illustrative DGD spectra that can be generated using the generator shown in FIG. 10A according to this invention;

FIG 10C shows seven illustrative Second Order PMD (SOPMD") spectra that can be generated using the generator shown in FIG. 10A according to this invention;

FIG. 15A shows four illustrative birefringent stages and their respective DGD values and extraordinary axis orientations according to this invention;

FIG. 15B shows PMD vectors, which exist in three-dimensional Stokes space, that correspond to the elements shown in FIG. 15A.

DETAILED DESCRIPTION OF THE INVENTION

Figure 1:
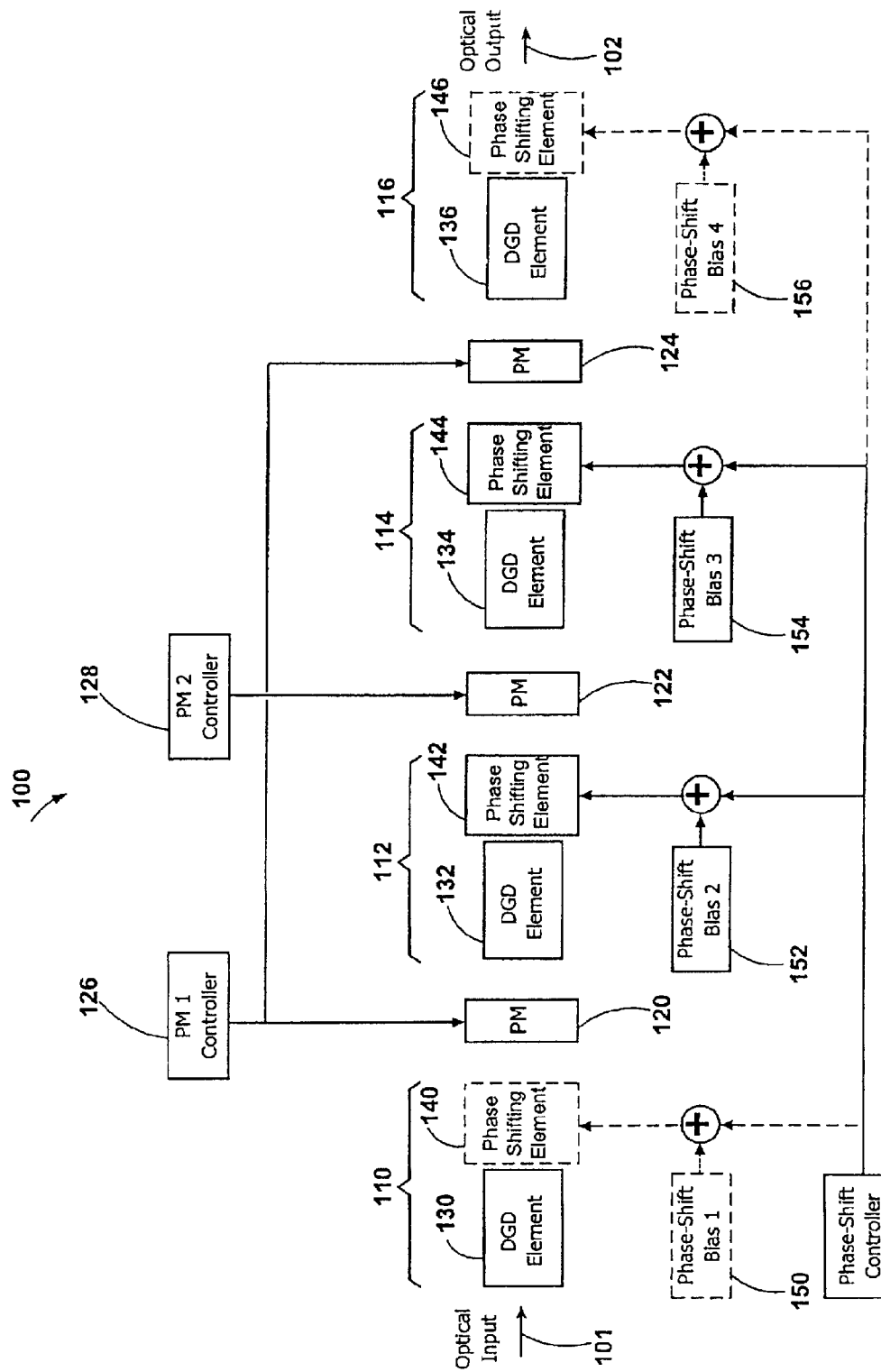
FIG. 1 shows illustrative PMD generator, including an optional phase-shifting element in each of the first and last stages, with an input optical beam and an output optical beam in accordance with this invention.

Many of the terms used to describe this invention have already been defined in U.S. patent application Ser. No. 10/013,890, filed Dec. 7, 2001, entitled "METHODS AND APPARATUS FOR FREQUENCY SHIFTING POLARIZATION MODE DISPERSION SPECTRA," and Ser. No. 10/013,596, also filed Dec. 7, 2001, entitled "METHODS AND APPARATUS FOR GENERATION AND CONTROL OF COHERENT POLARIZATION MODE DISPERSION," which are hereby incorporated by reference herein in their entireties.

A PMD generator according to this invention can predictably and repeatedly generate first, second, and higher orders of PMD, and is capable of frequency shifting a PMD spectrum. Such frequency shifting can be particularly useful for scanning a fixed frequency optical signal.

To predictably generate PDCD and higher order PMD, more than two birefringent stages are used, for example four stages, and those stages can be calibrated during construction. A PMD generator should be calibrated in advance and sufficiently stable against thermal and acoustic variations, as well as other types of perturbations.

Calibration normally involves measuring and recording the amounts of polarization mode-mixing between stages and the residual optical retardation of the relevant stages at a calibration optical frequency. To ensure that an initial calibration remains valid and useable at a later time, a PMD generator should be sufficiently stable to temperature, vibration, and other perturbations. Birefringent crystals are suitable to limit temperature and vibration dependence. To frequency shift a resultant PMD spectrum, birefringent phase-shifting elements, as reported by Evans in "The Birefringent Filter," *J. Optical Soc. of America*, Vol. 39, No. 3, at 229–242 (March, 1949) (hereinafter, "Evans"), can be included in each birefringent stage.

According to one aspect of this invention, a method for constructing and calibrating a coherent PMD generator is provided. As explained above, a generator according to this invention can include a first stage, a second stage, a third stage, and a fourth stage in optical serial alignment. Each of the stages includes a harmonic DGD element. The second and third stages each include a DGD element that is harmonic and further includes a phase-shifting element. The first and last stages can also include phase-shifting elements and these stages' DGD elements can be harmonic. The generator can also include a first mode-mixing element between the first and second stages, a second mode-mixing element between the second and third stages, and a third mode-mixing element between the third and fourth stages.

As explained more fully below, the calibration method includes, as a first step, making the stages coherent, with the possible exception of the first and last stages. Once all the relevant stages are coherent, calibration can involve optimizing (e.g., minimizing) polarization mode-mixing between pairs of adjacent stages. This can involve inserting a mode-mixing element between a pair of adjacent stages and rotating the element until substantially no polarization mode-mixing occurs between the pair of stages. Alternatively, it can involve rotating the stages themselves until polarization mode-mixing is either substantially minimized or maximized.

A PMD generator according to this invention builds on two copending, commonly-owned patent applications. First, Damask U.S. patent application Ser. No. 10/013,890, filed Dec. 7, 2001, (hereinafter, "Damask '890") describes a generator that can continuously frequency-shift a PMD spectrum by incorporating birefringent phase-shifting elements. Second, Damask U.S. patent application Ser. No. 10/013,596, filed Dec. 7, 2001, (hereinafter, "Damask '596") describes a generator that can generate coherent PMD by incorporating phase-compensation elements into each birefringent stage. As also described in Damask '596, independent generation of first and second order PMD using a four-stage coherent PMD generator through control of polarization mode-mixing between stages. Thus, the PMD generator according to this invention combines four-stage coherency, independent first and second order PMD control, and frequency shifting into a single apparatus.

A four stage apparatus according to this invention can generate DGD, depolarization, PDCD, and various higher order PMD states. Four variable birefringent phase-shifting elements, one associated with each birefringent stage, are used in lieu of explicit phase compensator elements, as in Damask '596, to continuously frequency shift a resultant PMD spectrum while keeping the spectral shape intact.

As explained more fully below, three PMD coordinates can be sufficient to fully describe the resultant PMD spectra: the DGD magnitude at a center optical frequency, the SOPMD magnitude at the same center frequency, and the particular value of the center frequency.

FIG. 1 shows illustrative PMD generator 100 with input optical beam 101 and output optical beam 102. Beam 101 propagates sequentially through each of the optical elements that make up generator 100, thereby generating beam 102, which has an amount of generated PMD induced thereon. As shown in FIG. 1, generator 100 includes four birefringent stages 110, 112, 114, and 116 that generate substantially the same magnitude of differential group delay (e.g., "DGD"). Each pair of adjacent stages 110 and 112, 112 and 114, and 114 and 116 has an intermediate polarization mode-mixing element 120, 122, and 124, respectively. Thus, element 120 is located between stages 110 and 112, element 122 is located between stages 112 and 114, and element 124 is located between stages 114 and 116. The amounts of mode-mixing introduced between stages is determined by two polarization mode-mixing controllers, which control elements 120, 122, and 124. In particular, elements 120 and 124 are controlled by controller 126, and element 122 is controlled by controller 128. FIG. 5 of Damask '596 shows a similar four-stage PMD generator having four equal-value DGD stages and two controllers for the three mode-mixing elements.

Each of birefringent stages 110, 112, 114 and 116 includes DGD element 130, 132, 134, and 136 respectively, each of which imparts DGD on a propagating optical beam. DGD elements can include, for example, birefringent alpha barium borate, yttrium ortho-vanadate, rutile, lithium niobate, mica, quartz crystals, or any combination thereof. Also, the DGD elements can include multiple birefringent elements that optimize at least one physical attribute, such as free-spectral range, optical retardation temperature coefficient, thermal expansion coefficient, or any combination thereof.

Birefringent stages 110, 112, 114, and 116 also include phase-shifting elements 140, 142, 144, and 146, respectively, each of which changes the optical retardation of the associated stage. As mentioned above, first and last birefringent stages 110 and 116 need not include phase-shifting elements 140 and 146, respectively. When the first and last stages of a PMD generator according to this invention do not include phase-shifting elements, no change occurs in the generated PMD spectrum. However, a difference can be observed in the polarization transformation from input 101 to output 102, although this transformation is believed to have no bearing on the resultant PMD spectrum. The order of DGD element and the phase-shifting element within a stage is not important.

Phase-shifting elements 140, 142, 144, and 146 can be controlled by single phase-shift controller 148. Moreover, a phase-shift bias can be added to each phase-shifting element separately. This addition can be performed either through software or through hardware-based circuitry. As explained more fully below, phase-shift biases 152 and 154, and optionally biases 150 and 156, can assist with the calibration of PMD generator 100. FIG. 1 of Damask '890 shows a PMD generator that includes dedicated, tunable phase-shifting elements and controllers for each birefringent stage.

Optical retardation is a measure of phase slip between two polarization component beams present in a birefringent medium. When two orthogonally polarized beams are perfectly in phase, the retardation is zero. When the same beams slip by one full wave, the retardation is $2\pi$. Similarly, when the same beams slip by two full wavelengths, the retardation is $4\pi$. The retardation value, thus, can be referred to by modulo $2\pi$. Thus, any number of integral full wave slips corresponds to zero retardation modulo $2\pi$. Optical retardation is thus better used as a measure of the fractional slip in phase between two component optical beams.

Figure 2:
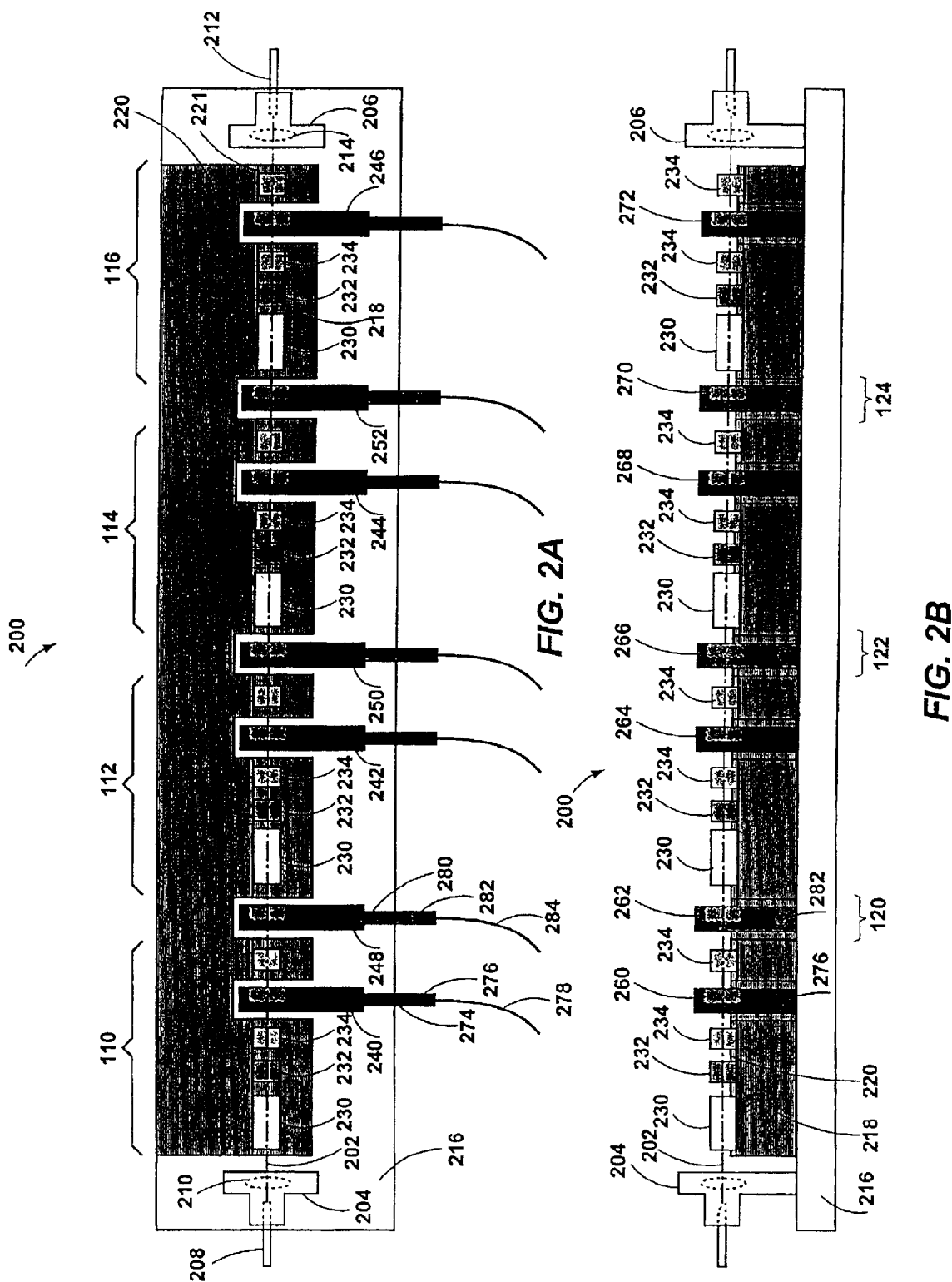
FIGS. 2A and 2B show a planar top view and an elevational view of an illustrative PMD generator according to this invention.

For example, a half-wave phase slip corresponds to a retardation of $\pi$. The term residual optical retardation is used to emphasize the distinction between a large number of $2\pi$ phase slips and a remaining fractional slip. Phase-shifting elements 140, 142, 144, and 146 can be designed to either continuously or discontinuously tune optical retardation. A more complete discussion of optical retardation and polarization component phase slip is provided in the descriptions of FIGS. 2 and 3 of Damask '890, for example, which is incorporated by reference herein.

PMD generator 100 generates PMD in an unusual manner. Typically, PMD generation is controlled only by using polarization mode-mixing elements between birefringent stages. PMD generator 100, however, uses two different types of controls: one for polarization mode-mixing and another for frequency shifting the PMD spectrum.

FIGS. 2A and 2B show two different views of illustrative embodiment 200 of PMD generator 100. FIG. 2A shows a planar top view and FIG. 2B shows an elevational view. Collimated optical beam 202 is provided by fiber collimating assembly 204 and received by fiber collimating assembly 206, and propagates through each of the optical elements therebetween. Assembly 204 includes optical fiber 208 that can be angle polished to reduce back reflection (not shown) and collimating lens 210 to collimate light emergent from fiber 208. Similarly, assembly 206 can include optical fiber 212 that can be angle polished to reduce back reflection and collimating lens 214 to focus collimated optical beam 202 into input facet (not shown) of fiber 212. Assemblies 204 and 206 can be mounted on optical baseplate 216.

To facilitate vertical alignment between optical beam 202 and the optical elements intersected by beam 202, pedestal 218 can be mounted on optical baseplate 216. As shown best in FIG. 2A, pedestal 218 can have four wide ledges and four narrow ledges. To provide for lateral alignment between optical beam 202 and the optical elements intersected by beam 202, reference flat 220 can be mounted to pedestal 218 such that straight edge 221 of flat 220 is substantially parallel to optical beam 202.

Type I birefringent crystal or crystals 230 and type II birefringent crystal or crystals 232 can be mounted on pedestal 218 and aligned to abut straight edge 221. A pair of crystals is mounted on each of four wide ledges of pedestal 218, each pair including type I crystal 230 and type II crystal 232. Type I crystal 230 and type II crystal 232 can be, for example, $YVO_4$ and $LiNbO_3$, respectively, having length ratios commensurate with the minimization of temperature dependence of the pair, having absolute length selected to produce a desired amount of DGD, and having respective extraordinary birefringent axes aligned parallel to one another.

For example, a $YVO_4$ length of 15 mm and a $LiNbO_3$ length of 2 mm produces a temperature dependence of the pair that is less than either crystal alone, and further produces approximately 10 ps of DGD. It will be appreciated that any number of type I crystals can be placed on each wide pedestal ledge, and any number of type II crystals can be placed on each wide pedestal ledge, so long as the cumulative DGD of one birefringent stage is substantially the same as the cumulative DGD of another birefringent stage. Also, it will be appreciated that the order of type I and type II crystals does not impact the resultant PMD spectrum.

Eight phase-shifting quarter-wave waveplates 234 can be mounted on pedestal 218 and aligned to abut straight edge 221. One waveplate 234 is mounted on each wide pedestal ledge and one waveplate 234 is mounted on each narrow pedestal ledge, in both cases aligned to abut straight edge 221. Each waveplate 234, which can be located on a wide pedestal ledge, is further located to follow the pair of type I crystal 230 and type II crystal 232 also located on the same wide pedestal ledge such that optical beam 202 intersects type I crystal 230 and type II crystal 232, and subsequently intersects waveplates 234.

Phase-shifting elements' rotary stage housings 240, 242, 244, and 246 can be mounted to baseplate 216 as shown. Each rotary stage housing can include rotary motor 274, rotary motor encoder 276, and input/output cable 278. Rotary motor 274 can drive a rotary stage (not shown) located within the rotary stage housing and controlled via cable 278. The number of revolutions of motor 274 can be counted by encoder 276 and fed back to a controller (not shown) via cable 278. Rotary stage housing 240 can house half-wave waveplate 260, positioned such that optical beam 202 intersects waveplate 260 substantially in its center and such that the polarization of optical beam 202 is transformed by waveplate 260 by about a half wave.

Similarly, rotary stage housings 242, 244, and 246 can house half-wave waveplates 264, 268, and 272, respectively, positioned such that optical beam 202 intersects waveplates 264, 268, and 272 substantially in the center and also such that the polarization of optical beam 202 is transformed by waveplates 264, 268, and 272 by approximately a half wave.

Polarization mode-mixing element rotary stage housings 248, 250, and 252 can be mounted onto baseplate 216 at the indicated locations. Each housing can include rotary motor 280, rotary motor encoder 282, and input/output cable 284. Rotary motor 280 can drive a rotary stage (not shown) located within the rotary stage housing and can be controlled via cable 284. The number of revolutions of motor 280 can be counted by encoder 282 and fed back to a controller (not shown) via cable 284. Located within rotary stage housings 248, 250, and 252 are half-wave waveplates 262, 266, and 270, respectively, positioned such that optical beam 202 intersects waveplates 262, 266, and 270 substantially in the center and also such that the polarization of optical beam 202 is transformed by waveplates 262, 266, and 270 by substantially a half wave.

Each component of generator 100 corresponds to a particular component, or combination of components, of apparatus 200. For example, DGD element 130 in birefringent stage 110 corresponds to crystals 230 and 232, which are mounted on the left-most wide pedestal ledge (shown in FIGS. 2A and 2B). Similarly, phase-shifting element 140 in birefringent stage 110 corresponds to quarter-wave waveplates 234, mounted to the first wide and narrow pedestal ledges, and half-wave waveplate 260, which is mounted to rotary stage 240. Likewise, birefringent stages 112, 114, and 116 include respective type I and type II crystals, a quarter-wave waveplate pair, and phase-shifting elements' rotary housings with included half-wave waveplates.

Polarization mode-mixing element 120 of generator 100 corresponds to polarization mode-mixing rotary housing 248 and half-wave waveplate 262. Likewise, mode-mixing elements 122 and 124 correspond to polarization mode-mixing rotary housings 250 and 252 and half-wave waveplates 266 and 270, respectively. Simultaneous rotation of phase-shifting half-wave waveplates 264 and 268 can phase-shift the PMD spectrum at optical output 102 while keeping the spectral shape substantially intact. Waveplates 260 and 272 can also be rotated with waveplates 264 and 268, if desired. Rotation of one or more of polarization mode-mixing half-wave waveplates 262, 266, and 270 can change the shape of the PMD spectrum at optical output 102 without concurrent change of the spectrum phase.

Figure 3:
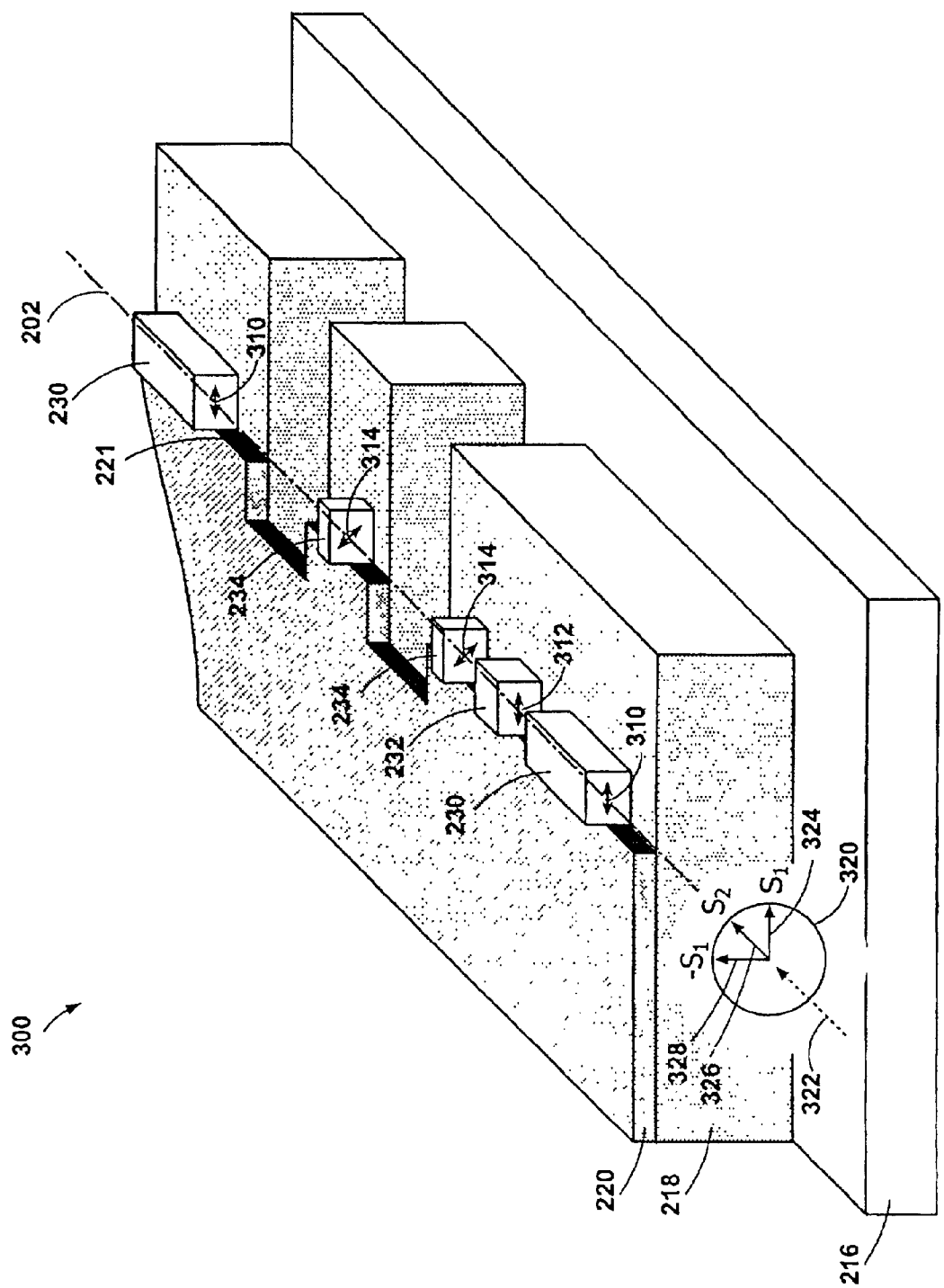
FIG. 3 shows a simplified perspective view of portion of generator according to this invention.

FIG. 3 shows a simplified perspective view of portion 300 of generator 200. Reference flat 220, having straight edge 221 that is substantially aligned parallel to optical beam 202, can be mounted to pedestal 218. Pedestal 218 can be mounted to (e.g., on top of) baseplate 216. Birefringent crystals 230 and 232, and waveplates 234, are mounted on pedestal 218 such that all crystals and waveplates abut straight edge 221. Also, each birefringent element, crystal or waveplate, preferably has a birefringent axis in the plane that is perpendicular to optical beam 202.

Although the absolute orientation of any of the birefringent axes to baseplate 216 is immaterial, the relative orientations from crystal to crystal and waveplate to waveplate are important. For example, type I crystal 230 has extraordinary axis 310 aligned horizontally, which is parallel to the top face of pedestal 218. Likewise, type II crystal 232 has extraordinary axis 312 that is aligned in a parallel fashion with extraordinary axis 230. Alternatively, extraordinary axis 312 can be aligned perpendicular to extraordinary axis 310, depending on the birefringent materials that are employed. Quarter-wave waveplates 234 have extraordinary axes 314 that are aligned at an angle of −45 degrees with respect to extraordinary axis 310. Alternatively, axes 314 can be tilted +45 degrees.

FIG. 3 includes a Stokes space representation of polarization states that will be used in the description below to illustrate a calibration procedure. To provide a meaningful association with a physical coordinate space, plane 320 has a normal axis that is substantially parallel to optical beam direction 322. Within plane 320 is horizontal axis 324, vertical axis 328, and 45 degree axis 326. Axes 324, 326, and 328 are associated with Stokes coordinates S1, S2, and −S1, respectively.

FIG. 4A shows a perspective view of illustrative combination 400 of optical elements along optical path taken by optical beam 101 as it propagates toward the output to become output optical beam 102. The optical elements that make up combination 400 correspond to the more generalized generator shown in FIG. 1 as follows.

In particular, birefringent stage 110 includes type I birefringent crystal 230, type II birefringent crystal 232, followed by quarter-wave waveplate 234, half-wave waveplate 260, and quarter-wave waveplate 234. Similarly, birefringent stages 112, 114, and 116 include type I birefringent crystals 230, type II birefringent crystals 232, following by quarter-wave waveplates 234, half-wave waveplates 264, 268, and 272, respectively, and quarter-wave waveplates 234. Waveplates 260, 264, 268, and 272 are mounted on rotary stages (not shown) that provide for rotation of associated extraordinary axes 410, 412, 414, and 416, respectively. As explained more fully above, crystals 230 and 232, along with quarter-wave waveplates 234, can be mounted to pedestal 218. Waveplates 262, 266, and 270 are mounted on rotary stages (not shown) that provide for rotation of associated extraordinary axes 420, 422, and 424, respectively.

FIG. 4B shows schematic functional block diagram 401, which is associated with combination 400 of FIG. 4A. Birefringent stage 110 imparts DGD magnitude τ on input optical beam 101, and further imparts optical retardation error $\phi_{\epsilon 1}$ followed by optical retardation $\phi(2\theta_\alpha - 2\theta_{\epsilon 1})$, the latter of which cancels optical retardation error $\phi_{\epsilon 1}$ and imparts remaining optical retardation $\phi(2\theta_\alpha)$. Similarly, birefringent stages 112, 114, and 116 impart DGD magnitude $\tau$ on optical beam 202, and further imparts optical retardation errors $\phi_{\epsilon 2}$, $\phi_{\epsilon 3}$, and $\phi_{\epsilon 4}$, respectively, followed by optical retardations $\phi(2\theta_\alpha-2\theta_{\epsilon 2})$, $\phi(2\theta_\alpha-2\theta_{\epsilon 3})$, and $\phi(2\theta_\alpha-2\theta_{\epsilon 4})$, respectively.

Optical retardations $\phi(2\theta_\alpha-2\theta_{\epsilon 1})$, $\phi(2\theta_\alpha-2\theta_{\epsilon 2})$, $\phi(2\theta_\alpha-2\theta_{\epsilon 3})$, and $\phi(2\theta_\alpha-2\theta_{\epsilon 4})$ substantially, and preferably completely, cancel optical retardation errors $\phi_{\epsilon 1}$, $\phi_{\epsilon 2}$, $\phi_{\epsilon 3}$, and $\phi_{\epsilon 4}$, respectively, and impart remaining optical retardations $\phi(2\theta_\alpha)$. Thus, each of birefringent stages 110, 112, 114, and 116 imparts essentially the same DGD magnitude $\tau$ and residual optical phase $\phi(2\theta_\alpha)$ on optical beam 202. Polarization mode-mixing between stages is achieved with mode-mixing elements 120, 122, and 124.

Figure 11:
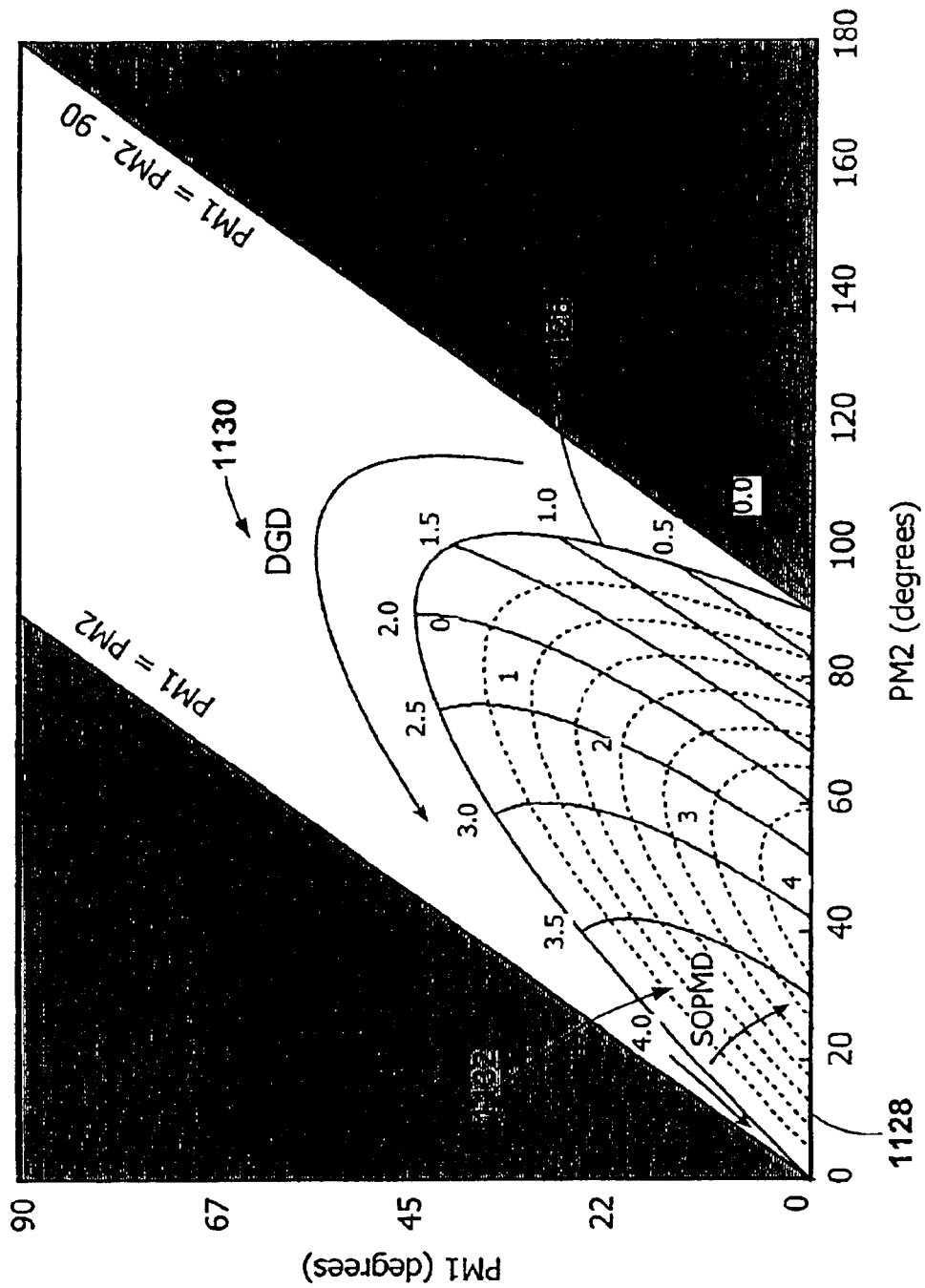
FIG. 11 shows contour plot of superimposed DGD and SOPMD values at an optical frequency for different mode-mixing control values PM1 and mode-mixing control values PM2 according to this invention.
Figure 12:
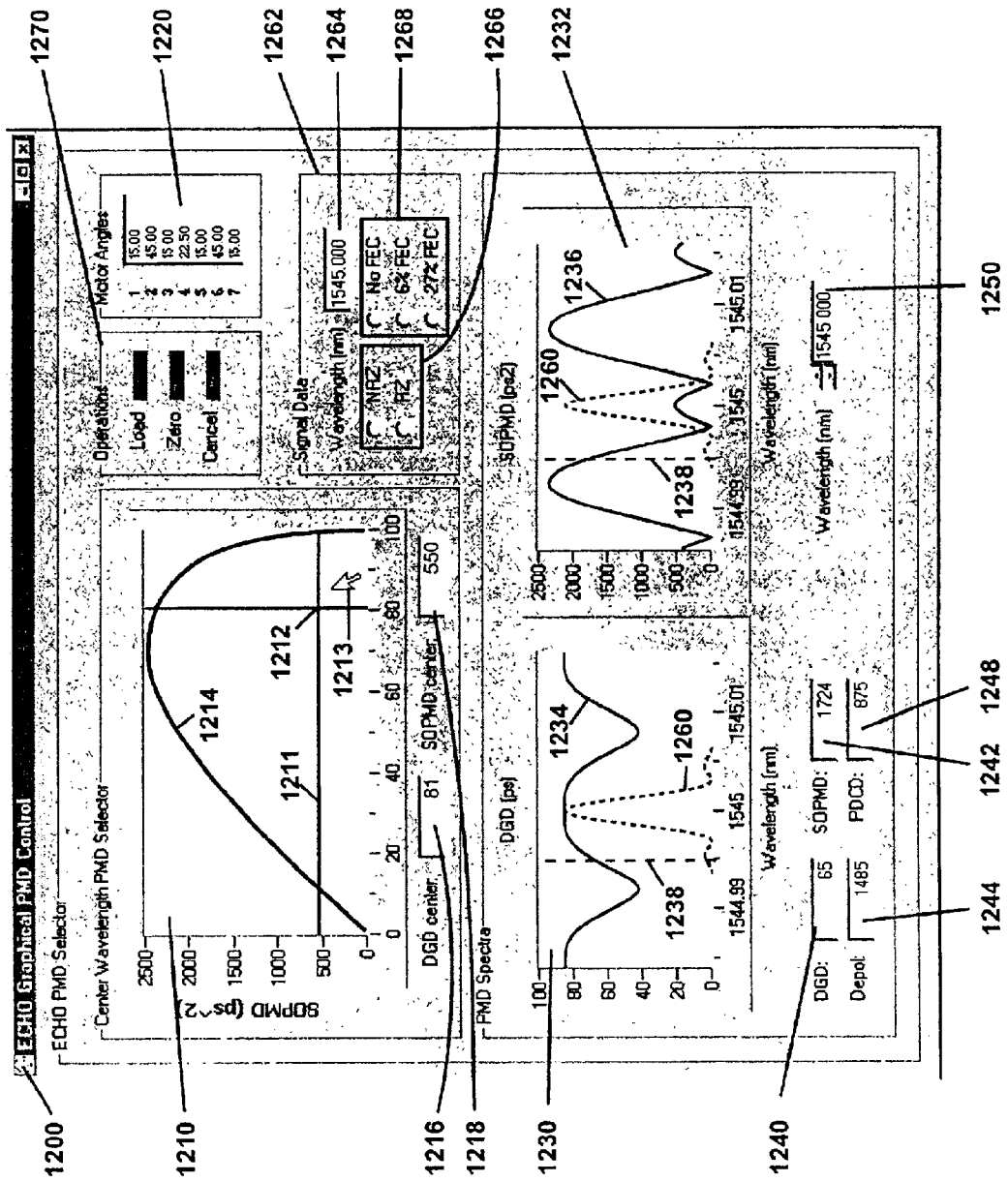
FIG. 12 shows an illustrative graphical user interface in which a user can interactively chose PMD spectral shapes, DGD and SOPMD values, and relative frequency alignment between an optical signal and the PMD spectrum according to this invention.

It will be appreciated that a more complete description of optical retardation error can be found in connection with FIGS. 11 and 12 of Damask '596, which is hereby incorporated by reference in its entirety.

FIG. 5A shows a perspective view of illustrative birefringent stage 500 with input optical beam 501 and output optical beam 502. Birefringent stage 500 includes DGD element 504 and phase-shifting element 506. DGD element 504 includes type I birefringent crystal 230 and type II birefringent crystal 232. Phase-shifting element 506 includes quarter-wave waveplates 234, and half-wave waveplate 508. Like Evans, phase-shifting element 506 is located in optical series with birefringent stage 504 to continuously tune the optical retardation imparted to optical beam 501 by the stage.

Continuous tuning can be accomplished by rotating extraordinary axis 510 of waveplate 508. FIGS. 5B–5F show the faces of elements 230, 232, 234, 508, and 234 shown in FIG. 5A, respectively. FIG. 5B also shows, for purposes of illustration only, a common physical coordinate system with x-axis 520 aligned horizontally and y-axis 522 aligned vertically. While the absolute orientations of the extraordinary axes of the elements are not critical, the relative orientations of these axes with respect to each other are important to both generate DGD spectra and phase-shift them.

As shown in FIGS. 5B–5F: (1) extraordinary axes 310 and 312 can be substantially parallel with x-axis 520, (2) extraordinary axes 314 of quarter-wave waveplates 234 are rotated by -45 degrees with respect to x-axis 520, and (3) extraordinary axis 510 is first rotated by +45 degrees with respect to x-axis 520 to align with axis 522, and can be further rotated by tuning angle 524. When tuning angle 524 is zero, no phase-shift is imparted on output optical beam 502.

Alternative relative orientations of the extraordinary axes are possible. For example, extraordinary axes 314 can be rotated to +45 degrees with respect to x-axis 520 and concurrently axis 522 can be rotated to -45 degrees. Also, extraordinary axis 312 can be aligned perpendicular to extraordinary axis 310, depending on the selection of the birefringent material.

The measured rotation of half-wave waveplates 260, 262, 264, 266, 268, 270, and 272 is central to the calibration and operation of PMD generator 100. Rotation of a waveplate placed on a rotary stage can require only a motor and a gear that is engaged with the motor. A measured rotation further requires a means to measure the rotation of the gear or the rotation of the motor shaft. Calibration preferably uses a physical reference that provides a means to set the gear to a repeatable position.

FIG. 6A shows an elevational view of illustrative rotary stage 600, which includes apparatus for measured rotation and calibration. Rotary stage housing 602 provides mechanical support for motor 604 and rotary gear 610. Motor 604 and gear 610 engage so that when the motor shaft of motor 604 rotates, gear 610 likewise rotates, albeit with a gear ratio that depends on the specific construction. Motor encoder 606 can be attached to motor 604 to measure the motor shaft rotations. A signal can be provided to rotary stage 600 through line 608 and can report to a controller (not shown) the number of shaft rotations. Alternatively, an encoder can be attached to gear 610 to measure gear rotation.

To calibrate stage 600, finger 612 (which can be, for example, optically, mechanically, or electrically detectable) can be attached to gear 610. Finger detector (such as finger contact 614) can be attached to rotary housing 602. A signal can be provided by line 616 to a controller (not shown) to indicate when finger 612 is detected by (e.g., comes into contact with) finger detector 614. As mentioned above, rather than using mechanical or electrical contact means, an optical signal, such as a dark bar marked on an otherwise reflective gear circumference can be detected with a photodiode attached to the rotary housing.

FIG. 6B shows an illustrative orientation of waveplate 622 on gear 610. To describe this orientation, there are at least two relevant axes. First, reference axis 632 is defined by the orientation of gear 610 that is required to close contact 614 with finger 612. Second, extraordinary axis 624 is intrinsically defined by waveplate 622. Angle 634 is the angle between reference axis 632 and intrinsic axis 624. Angle 634 can be measured with motor encoder 606, if, for example, an additional means to find axis 624 is provided.

PMD generator 100 can generate a coherent PMD spectrum. That coherency can be achieved when the intermediate stages satisfy two conditions: (1) the DGD magnitudes $\tau$ for stages are substantially the same, and (2) the state of polarization output from each birefringent stage is substantially the same as the state of polarization input to each birefringent stage for a particular calibration optical frequency. These conditions can also be applied to the first and last stages. When the input and output polarization states are the same for a stage at a calibration optical frequency, the stage is said to exhibit zero residual optical retardation. As explained more fully in Damask '890 and Damask '596, one can provide birefringent crystals that have nearly the same DGD magnitudes. Yet it can be difficult to produce the same residual optical retardation for all the crystals.

Rather than add additional phase compensating waveplates to the apparatus, and in accordance with another aspect of this invention, the phase-shifting elements can be used to correct for any optical retardation error in the birefringent crystals.

One possible calibration procedure that can be used in accordance with this invention to drive each birefringent stage to substantially zero residual optical retardation is now described. The following calibration procedure makes every stage coherent with respect to the others and optimizes polarization mode-mixing between adjacent stages. It will be appreciated that the first and last stages need not be made coherent, thereby simplifying the overall calibration procedure.

In general, a coherent PMD spectrum is a DGD spectrum that is harmonic and has Fourier components of the harmonic DGD spectrum that are all in phase with one another. As used herein, a harmonic DGD spectrum is a DGD spectrum having Fourier-component frequencies that are all an integral multiple of a unit Fourier-component frequency. A DGD spectrum can be harmonic and not coherent, but a coherent DGD spectrum is necessarily harmonic. A more complete description of coherent PMD generation, and including harmonic DGD generation, can be found in Damask '596 (e.g., FIGS. 1, 2, 17, 18), which is hereby incorporated by reference herein.

Construction and calibration of a coherent PMD generator according to this invention relies, in part, on how the polarization state transforms through the various birefringent stages and waveplates at a particular optical frequency. As used herein, the specific optical frequency employed during the calibration procedure is called the calibration optical frequency, or simply calibration frequency. It will be appreciated that any calibration frequency can be selected, but, once selected, the frequency should not be changed—at least until calibration of the entire instrument is complete.

FIG. 7A shows a simplified top planar view of illustrative embodiment 700 of PMD generator 100. For illustrative simplicity, generator 700 only shows the optical components used to construct the first birefringent stage. During calibration, collimated optical beam 202 emerges from fiber and lens assembly 702 and is captured by lens and fiber assembly 704. In the stage shown, optical beam 202 sequentially propagates through type I and type II birefringent crystals 706 and 708, respectively, quarter-wave waveplate 710, half-wave waveplate 712, and quarter-wave waveplate 714. Birefringent crystals 706 and 708 impart DGD onto optical beam 202 and, explained above, further impart a net residual optical retardation. The phase-shifting element, which includes waveplates 710, 712, and 714, can impart an additional optical retardation onto optical beam 202.

FIG. 7B illustrates a Stokes space representation of the polarization transformation that takes place during beam propagation through crystals 706 and 708. The Stokes space is constructed on a unit-radius sphere in three-dimensional space (i.e., coordinates S1, S2, and S3). Stokes space has a physical analog. For example, coordinate S1 corresponds to a linear polarization state aligned to a horizontal axis, coordinate S2 corresponds to a linear polarization state aligned at 45 degrees to a horizontal axis, and coordinate S3 corresponds to a circular state of polarization, which has no bias towards any particular physical direction. It will be appreciated that equator 738 represents all linear states of polarization.

Returning to the polarization transformation that takes place during beam propagation through crystals 706 and 708 (at the calibration frequency), state of polarization 742 (shown in FIG. 7B) corresponds to position 720 along optical beam 202. State 742 can be considered aligned with coordinate S2 at the calibration frequency, and extraordinary axes of crystals 706 and 708 can be represented by birefringent axis 740 aligned along S1. Propagation of the beam through crystals 706 and 708 to position 722 induces a precession of input polarization state 742 about birefringent axis 740 (shown in FIG. 7B) along contour 746, terminating with at polarization state 744.

Although multiple full rotations of input state 742 about birefringent axis 740 may occur, rotation angle 748 of contour 746 between polarization states 742 and 744 is the residual optical retardation. If the residual optical retardation of each birefringent stage is zero, and yields a coherent PMD spectrum, residual optical retardation angle 748 will also be driven to zero.

FIG. 7C illustrates a Stokes space representation of the polarization state evolution through waveplates 710, 712, and 714 (shown in FIG. 7A). Together, waveplates 710, 712, and 714 make a phase-shifting element, where center waveplate 712 can be rotated to tune the degree of phase-shift. Birefringent axis 752 represents the compound birefringent axis of the 710, 712, and 714 waveplate system. With proper rotation of waveplate 712, polarization state 744 at physical location 722 can be transformed back along contour 754 to polarization state 742 at physical location 724 along optical beam 202.

FIG. 7D illustrates the relationship between physical space and Stokes space. Waveplate 712, which is located in rotary housing 716, has extraordinary axis 764. When extraordinary axis 764 of waveplate 712 lies horizontally, its birefringent axis is parallel to coordinate S1 324 in Stokes space. Similarly, when extraordinary axis 764 of waveplate 712 lies at +45 degrees, its birefringent axis is parallel to coordinate S2 in Stokes space. When axis 764 is aligned to null axis 522, zero optical retardation is imparted by waveplates 710, 712, and 714.

However, as extraordinary axis 764 is rotated away from null axis 522 by angle $\alpha$, polarization state 744 is rotated via precession about compound birefringent axis 752 by angle $2\alpha$. When polarization state 744, located at position 724 along optical beam 202, is rotated along contour 754 to coincide with polarization state 742, located at position 720 along beam 202, zero residual retardation is imparted from position 720 to 724 along beam 202 at the calibration frequency. As used herein, the term "phase-shift bias angle" can refer to the angle between extraordinary axis orientation 764 of waveplate 712 and reference axis 632. As described more fully below, the phase-shift bias angle can be recorded as a calibration step and subsequently used by an operator when the instrument requires zeroing.

Following angle recordation, second birefringent stage 112 can be mounted to the pedestal and baseplate, in series with first birefringent stage 110 shown in FIG. 7A. Second phase-shifting element half-wave waveplate (e.g., waveplate 264 of FIG. 2B), is rotated to determine the phase-shift bias angle that yields zero residual optical retardation at the calibration frequency for the concatenation of first and second birefringent stages. As another calibration step, this second phase-shift bias angle can be recorded.

Similarly, third birefringent stage 114 can be mounted to the pedestal and baseplate, in series with first and second birefringent stages 110 and 112. Third phase-shifting element half-wave waveplate (e.g., waveplate 268 of FIG. 2B), can be rotated to determine the phase-shift bias angle that yields zero residual optical retardation at the calibration frequency for the concatenation of first, second, and third birefringent stages. Determination and recordation of this third phase-shift bias angle is another calibration step.

Finally, fourth birefringent stage 116 can be mounted to the pedestal and baseplate, in series with first, second, and third birefringent stages 110, 112, and 114. Forth phase-shifting element half-wave waveplate (e.g., waveplate 272 of FIG. 2B) is rotated to determine the phase-shift bias angle that yields zero residual optical retardation at the calibration frequency for the concatenation of first, second, third, and forth birefringent stages. Determination and recordation of this fourth phase-shift bias angle is yet another calibration step.

The preceding calibration procedure completes the build of the four birefringent stages that are phase tuned so that all stages are coherent. Four phase-shift bias angles are recorded during the calibration procedure and used any time PMD generator 100 is set to a "home" position. Each phase-shift bias angle is the angle between reference axis 632 (determined, for example, by finger 612 and detector 614) and the extraordinary axis orientation 764 that yields zero residual optical retardation. It will be appreciated, however, that only the intermediate phase-shifting stages must be calibrated.

The next step in the construction and calibration of a PMD generator according to this invention is to add the mode-mixing waveplates. Like the phase-shifting elements' waveplates, mode-mixing waveplates need calibration. One possible calibration procedure is described next.

Figure 8A:
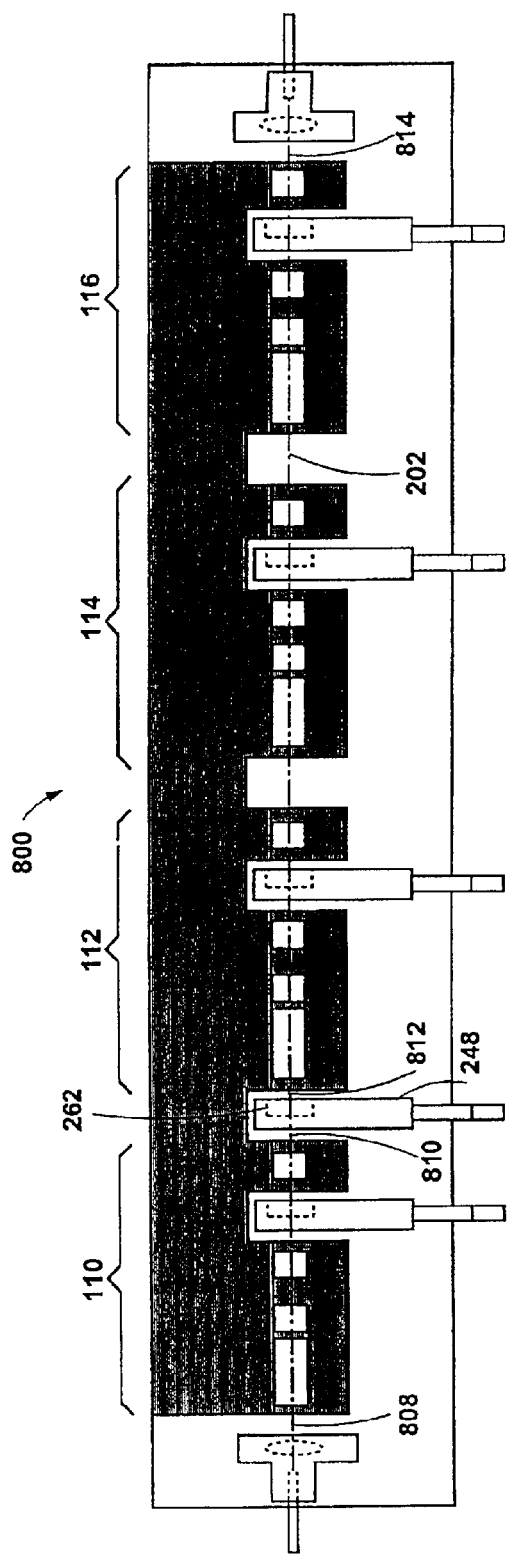
FIG. 8A shows an illustrative PMD generator with built up and calibrated birefringent stages according to this invention.

FIG. 8A shows illustrative PMD generator 800 with built up and calibrated birefringent stages 110, 112, 114, and 116. In addition to these four stages, half-wave waveplate 262, located in rotary housing 248, has been added as shown. Without loss of generality, the polarization state of optical beam 202 at location 808 can be aligned to Stokes axis S2, that is, linear and tilted by 45 degrees from horizontal.

Figure 8C:
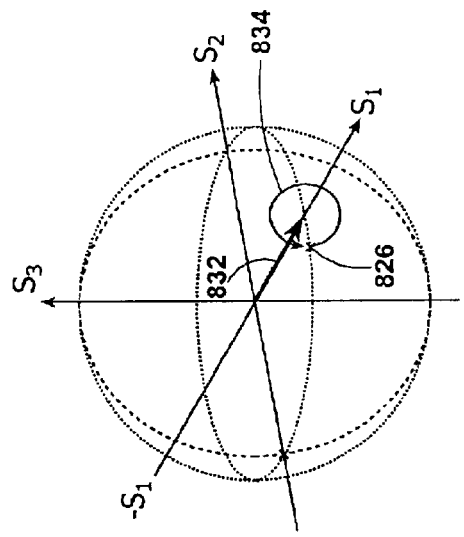
FIG. 8C shows how a polarization state is transformed along a contour between two polarization states according to this invention.
Figure 8B:
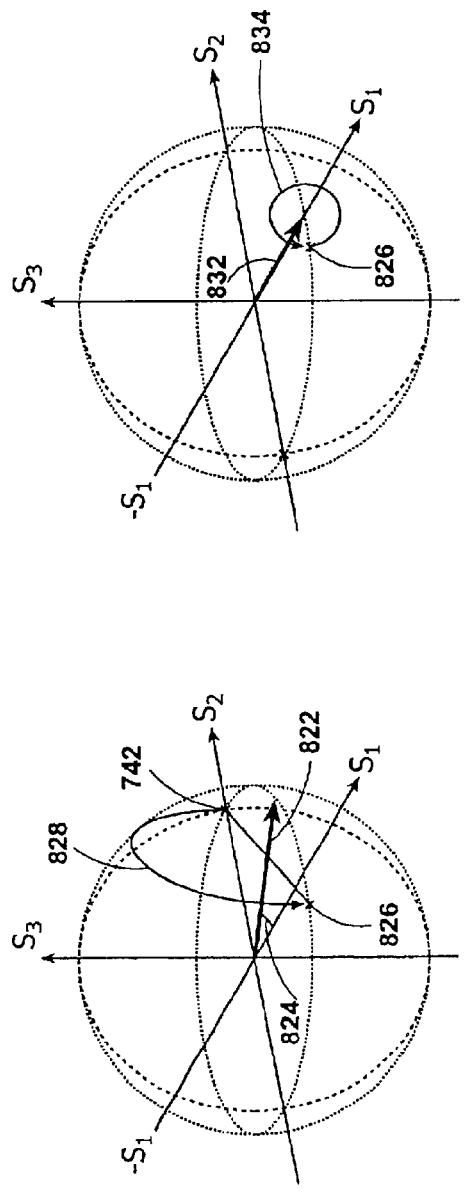
FIG. 8B illustrates a Stokes space representation of the polarization transformation through another waveplate according to this invention.

FIG. 8B illustrates a Stokes' space representation of the polarization transformation through waveplate 262 at the calibration frequency. Because birefringent stage 110 has been made coherent through previous calibration steps, the polarization state at location 810 (state 742) is the same as the polarization state at physical location 808. Half-wave waveplate 262 transforms any input polarization state by precessing it 180 degrees about the waveplate birefringent axis. Waveplate extraordinary axis 262 can be aligned to birefringent axis 822 as represented in Stokes' space. Angle 824 is a measure of the separation between birefringent axis 822 and Stokes' coordinate 732 (i.e., the horizontal linear polarization state).

Waveplate 262 induces subsequent polarization transformation during propagation from polarization state 742 at physical location 810 to polarization state 826 at physical location 812. FIG. 8C shows that polarization state 826 is transformed along contour 834 back to state 826 (at physical location 814) by the three remaining coherent birefringent stages 112, 114, and 116. As birefringent axis 822 is not aligned to Stokes' coordinate S1, output polarization state 826 is not orthogonal to input polarization state 742. In this case, polarization mode-mixing is introduced into the system. The optical system would not, therefore, be considered calibrated according to this invention.

Figure 8E:
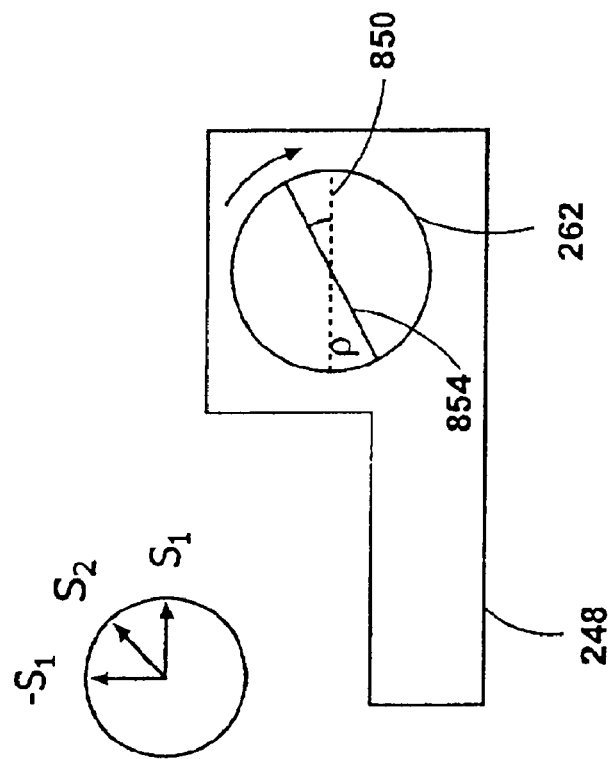
FIG. 8E shows that as an extraordinary axis of a waveplate is rotated through an angle, the birefringent axis rotates as well, as shown in FIG. 8D, according to this invention.
Figure 8D:
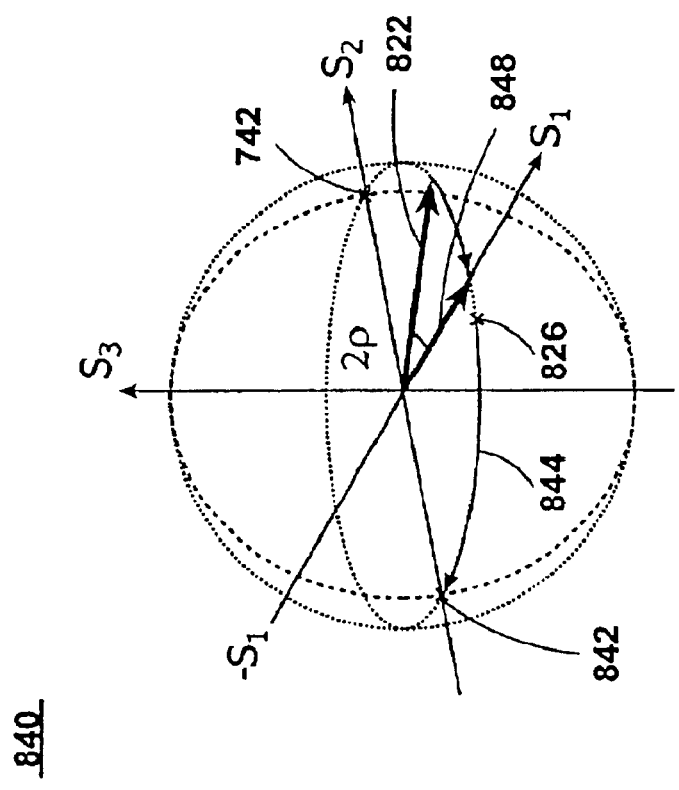
FIG. 8D shows how a polarization state is transformed along another contour according to this invention.

FIG. 8D shows Stokes space 840 that shows how polarization state 826 is transformed as waveplate 262 of FIG. 8E is rotated. Unlike the transformation motion of the phase-shifting elements, wherein polarization was transformed along a circle having its normal parallel to Stokes coordinate S1, the present transformation through the mode-mixing waveplate follows a circle in a plane having its normal axis parallel to Stokes coordinate S3.

FIG. 8E shows that as extraordinary axis 854 of waveplate 262 is rotated by angle ρ to horizontal axis 850, birefringent axis 822 rotates to orientation 848 by angle 2ρ in FIG. 8D. Polarization state 826, which corresponds to birefringent axis orientation 822, is transformed along contour 844 to polarization state 842 corresponding to birefringent axis orientation 848. Polarization state 842 is perpendicular to polarization state 742, which is to be expected when input polarization state and half-wave waveplate birefringent axis are at 45 degrees with respect to one another. In this case, the optical system (and particularly extraordinary axis 854) would be considered calibrated. The angle between reference axis 632 of rotary housing 248 and calibrated axis 854 can then be recorded as another calibration step.

After addition and calibration of the first mode-mixing element as described above, second mode-mixing half-wave waveplate 266, located in rotary housing 250, can be added (e.g., see FIG. 10A). Mode-mixing waveplate 266 is rotated to determine the required orientation to transform input polarization state 742 at location 808 back to polarization state 742 at location 814. As shown in FIGS. 6B and 8E, the angle between reference axis 632 of rotary housing 250 and birefringent axis 854 of waveplate 266 can be recorded as yet another calibration step.

Mode-mixing half-wave waveplate 270, located in rotary housing 252, can be added next and calibrated in a similar fashion. In particular, mode-mixing waveplate 270 can be rotated to determine the required orientation to transform input polarization state 742 at location 808 to polarization state 842 at location 814. Again, as shown in FIGS. 6B and 8E, the angle between reference axis 632 of rotary housing 252 and birefringent axis 854 of waveplate 270 can then be recorded as well.

The preceding illustrative calibration procedure involved recording four phase-shift bias angles and three polarization mode-mixing angles, although fewer angles may be necessary to calibrate the generator. These angles can be used at any time during operation of the PMD generator to achieve a "home" position. Each phase-shift bias angle is the angle between reference axis 632, which can be determined by a mechanical finger contact of a finger and a contact, and an extraordinary axis orientation that yields zero residual optical retardation. Similarly, each polarization mode-mixing angle is the angle between a reference axis, which can be determined by a mechanical finger contact and another contact, and an extraordinary axis orientation that yields zero polarization mode-mixing.

PMD generator according to this invention can be operated in a phase-shift mode, a spectral synthesis mode, or a combination of both modes. In the phase-shift mode, at least the intermediate, and optionally all of the phase-shifting elements, are changed in coordination so that a resultant PMD spectrum is shifted in frequency while keeping the spectral shape substantially intact. Spectral synthesis mode is where one, two, or all three of the polarization mode-mixers are changed individually or in coordination to generate a desired resultant PMD spectrum. As described more fully in Damask '596, the spectral synthesis mode can be operated with proper coordination of the three mode-mixers such that first and second order PMD at a particular optical frequency can be independently generated and controlled.

FIG. 9A shows illustrative PMD generator 200 with optical output beam 900. Phase-shift element controller 148 controls the angle and rotation of half-wave waveplates 260, 264, 268, and 272, mounted in rotary housings 240, 242, 244, and 246. Phase-shift biases 152, 154 are the phase-shift bias angles determined during generator calibration. Optional phase-shift biases 150 and 156 are the phase-shift bias angles that may be determined during generator calibration. Once bias angles 152 and 154, and optionally 150 and 156 are determined, phase-shift operation mode does not require change of the bias angles.

FIG. 9B shows illustrative DGD spectra generated on output beam 900 as a function of optical frequency. DGD spectra 920 and 922 have the same shape, but are offset in optical frequency. DGD spectrum 920 can be generated for one state of phase-shift element controller 148, and DGD spectrum 922 can be generated for another state of phase-shift element controller 148. The rotation of half-wave waveplates 260, 264, 268, and 272 by the same angle frequency shifts DGD spectrum 920 to DGD spectrum 922.

Both DGD spectra 920 and 922 have the same free-spectral range 924, which is the frequency offset from one period of the spectrum to another period. Frequency shift 930 is the optical frequency difference between representative point 926 located on DGD spectrum 920 and same point 928 located on DGD spectrum 922. As explained more fully in Damask '890 and Damask '596, the magnitude of phase-shift can be defined as $2\pi$ multiplied by frequency shift 930 divided by free spectral range 924. As waveplates 260, 264, 268, and 272 can be endlessly rotated, DGD spectrum 922 can be endlessly phase-shifted with respect to DGD spectrum 920.

FIG. 10A shows illustrative PMD generator 200 with optical output beam 1020. As described above, when generator 200 is operated in spectral synthesis mode, it can be operated such that first and second order PMD can be generated and controlled independently (hereinafter, "IFSO mode"). As shown in FIG. 10A, this IFSO mode can be achieved using polarization mode-mixing controller 1022 to control both the angle and rotation of half-wave waveplates 262 and 270 located in rotary housings 248 and 252, and by using polarization mode-mixing controller 1024 to control both the angle and rotation of half-wave waveplates 266 located in rotary housing 250.

FIG. 10B includes seven illustrative DGD spectra. Similarly, FIG. 10C shows seven corresponding illustrative second order PMD (hereinafter, "SOPMD") magnitude spectra. In IFSO mode, and according to one aspect of this invention, any DGD/SOPMD spectral pair can be generated on output beam 1020. Each of the seven different spectra corresponds to a different combination of settings of mode-mixing controllers 1022 and 1024. Both sets of DGD and SOPMD spectra are periodic with free-spectral range 1034. Optical spectrum center 1036 can, for example, correspond to the maximum DGD value for any generated DGD spectrum 1032. It will be appreciated that the DGD and SOPMD values at optical frequency 1036 can be plotted for all states of mode-mixing controllers 1022 and 1024 and are not limited to the seven shown.

FIG. 11 shows contour plot, which is essentially taken directly from FIG. 6 of Damask '596, of superimposed DGD and SOPMD values at optical frequency 1036 for different mode-mixing control values PM1 and mode-mixing control values PM2. Mode-mixing control values PM1 and PM2 can be restricted to lie within the bounds of contours 1126 and 1128 to ensure monotonicity. Within this restricted space, DGD and SOPMD vary monotonically from zero to maximum.

Each of contours 1130 maintain a particular DGD value. Similarly, each of contours 1132 maintain a particular SOPMD value. When operated in IFSO mode, PMD generator can generate at output 1020 any DGD/SOPMD combination available within restricted 1126 and 1128 ranges, can access any possible DGD value without changing the SOPMD value, can access any possible SOPMD value without changing the DGD value, or can vary both DGD and SOPMD by a predetermined amount.

Thus, a generator according to this invention can be restricted to operate along a predetermined DGD/SOPMD trajectory for at least one optical frequency. If a plurality of optical frequencies is desirable, those frequencies can be a set of WDM channel frequencies.

In either case, the first mode-mixing controller and the second mode-mixing controller can be programmed to coordinate mode-mixing between pairs of adjacent stages to generate a first amount of DGD and a second amount of SOPMD within a free-spectral range of the generated PMD spectrum.

For example, the polarization mode-mixing controllers can be programmed to vary the PMD spectrum by changing the first and second degrees of mode-mixing such that the DGD remains substantially fixed while the SOPMD varies. Alternatively, the controllers can be programmed to vary the PMD spectrum by varying the degrees of mode-mixing such that the amount of DGD changes at a predetermined rate while the amount of SOPMD varies. In yet another embodiment, the controllers can be programmed to vary the PMD spectrum by varying the degrees of mode-mixing such that the amount of SOPMD is substantially fixed while the amount of DGD varies. It will be appreciated that polarization mode-mixing can be performed in any number of other ways to achieve any desirable PMD spectral goal.

According to one embodiment, a constant DGD contour can be achieved by varying the polarization mode-mixing controllers substantially as follows:

$$\tau_o = 4\tau |\cos(PM1)| \times |\cos(PM2-PM1)|$$

where $\tau_o$ is the DGD amount, $\tau$ is a DGD value of an individual birefringent stage, PM1 is the degree of mode-mixing between the first pair of adjacent stages and the last pair of adjacent stages, and PM2 is the degree of mode-mixing between the intermediate pair of adjacent stages.

According to another embodiment, and not wishing to be bound by any particular theory, a constant SOPMD contour can be achieved by varying the polarization mode-mixing controllers substantially as follows:

$$|\tau_w| = \tau^2 \times \sqrt{(\tau_{1w}^2 + \tau_{2w}^2 + \tau_{3w}^2)},$$

where $$\tau_{1w} = 0,$$

$$\tau_{2w} = 0, \text{ and}$$

$$\tau_{3w} = 2\sin(PM1)\cos(PM1)\sin^2(PM2/2) + 4\cos(PM1)\cos^2(PM1/2)\sin(PM2) - 2\sin(PM1)\cos^2(PM2/2)(2+\cos(PM1))$$

and where $|\tau_w|$ is the amount of SOPMD at the center optical frequency.

A more complete discussion of IFSO mode operation is provided in the descriptions of FIGS. 6, 7, and 39–42 of Damask '596, for example, which is incorporated by reference herein.

It will be appreciated the while independent control and first and second order PMD can be a powerful method to generate PMD, that control strictly exists only at one optical frequency (e.g., frequency 1036 of FIG. 10B) or a plurality of evenly spaced frequencies. A PMD generator according to this invention can generate useful PMD spectra suitable to emulate or compensate PMD effects using the DGD and SOPMD values at frequency 1036 as a point of reference. Accordingly, a connection can be created between the various desirable PMD spectra that can be created by PMD generator 100 and the actual waveplate angles required to produce the spectra.

Thus, according to another aspect of this invention, a graphical user interface that automatically maps desirable PMD spectra into required waveplate angles is also provided.

FIG. 12 shows illustrative graphical user interface 1200 in which a user can interactively chose PMD spectral shapes, DGD and SOPMD values, and relative frequency alignment between an optical signal and the PMD spectrum. Center wavelength PMD selector region 1210 provides a user the ability to select a DGD/SOPMD combination at an optical frequency (e.g., frequency 1036). Crosshairs 1211 can be positioned with cursor 1213 by, for example, pointing at some position 1212 within selector region 1210 (preferably, under contour 1214). Contour 1214 shows the bounds of possible DGD and SOPMD states at frequency 1036. The DGD and SOPMD values defined at position 1212 can be displayed textually in display boxes 1216 and 1218, respectively. The required motor angles to generate the displayed DGD and SOPMD pair are internally calculated and can be optionally displayed in window 1220.

The entire DGD and SOPMD spectra over a full free spectral range can be calculated and displayed in spectral display regions 1230 and 1232, respectively. DGD spectrum 1234 and SOPMD spectrum 1236 can be plotted, for example, as a function of optical wavelength. Selector 1238 can be dragged with cursor 1213 to select the part of the PMD spectrum to display textually in display boxes 1216 and 1218. Text values of calculated DGD, SOPMD, and SOPMD components of depolarization and polarization dependent chromatic dispersion (PDCD), can also be calculated and displayed in display boxes 1240, 1242, 1244, and 1248, respectively.

The user can be provided the ability to select a particular spectral position (e.g., center wavelength) of spectra 1234 and 1236 using by wavelength selector 1250. When a center wavelength value is selected in window 1250, the four phase-shifting elements can be positioned so that the actual center wavelength of the resultant PMD spectrum is coincident with that value displayed in selector 1250. As the interaction with an optical signal spectrum with the generated PMD spectrum can be important, optical signal spectrum 1260 can also be displayed in DGD spectrum window 1230 and SOPMD spectrum window 1232.

The center wavelength, shape, and bandwidth of optical signal spectrum 1260 can be controlled by a user in selector window 1262. A user can select the center wavelength of optical spectrum 1260 in selector window 1264. Some of the options that can be provided to a user include allowing the user to select the data format using format selector 1266 (e.g., non-return to zero (i.e., NRZ) or return to zero (i.e., RZ)), and allowing the user to select certain bandwidth variations, such as no forward error correction, forward error correction with 6% overhead, or forward error correction with 27% overhead, using bandwidth selector 1268. This information can be used to calculate and graphically represent the center wavelength, shape, and bandwidth in windows 1230 and 1232. The user can also be provided with an opportunity to control the loading options in operations selector 1270, such as the loading of calculated motor angles into PMD generator 200.

PMD selection according to one aspect of this invention generally depends on three PMD coordinates: DGD value at frequency 1036, SOPMD value at frequency 1036, and the frequency shift between 1036 and a selected center frequency value. It will be appreciated that there are a variety of ways to display the forms in which PMD can be generated by a PMD generator, and there are a variety of PMD coordinates that can be used to control the PMD generator, such as generator 100. However, according to another aspect of this invention, a general scheme for controlling and interfacing with the PMD generator is provided.

Figure 13:
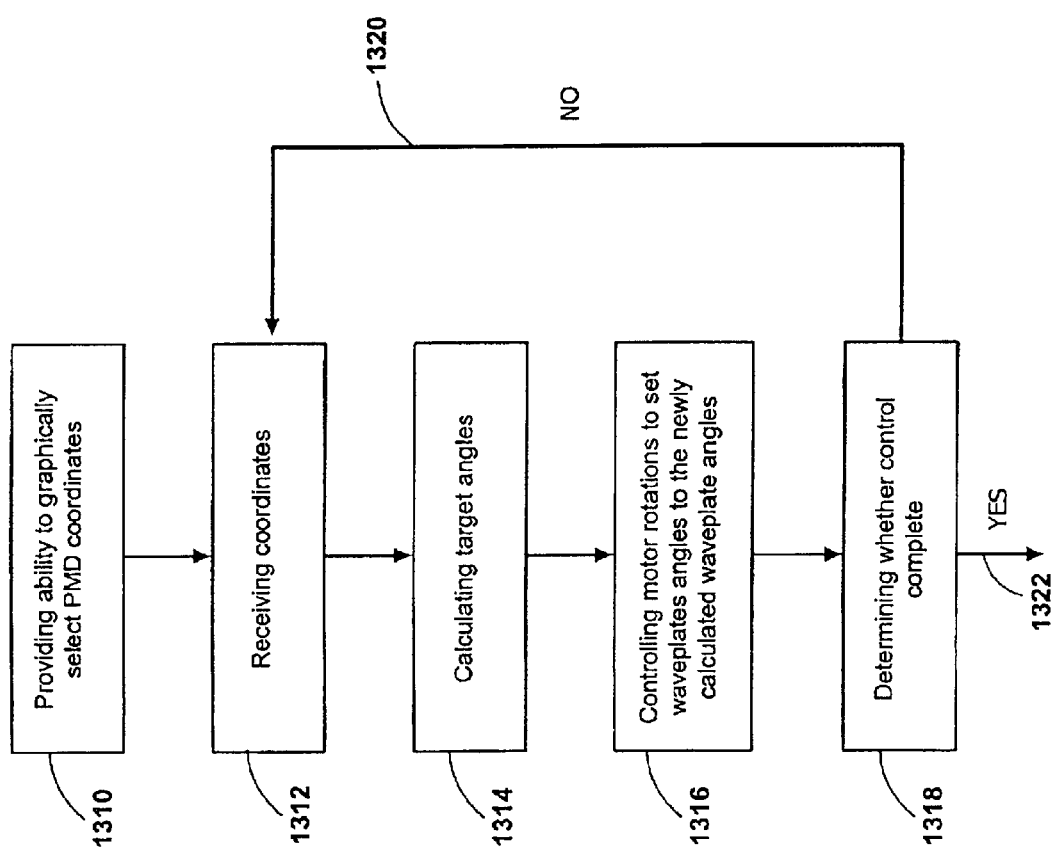
FIG. 13 shows a schematic block diagram of an illustrative method for controlling a PMD generator according to this invention.

FIG. 13 shows a schematic block diagram of an illustrative method for controlling a PMD generator according to this invention. In first optional step 1310, a user is provided the ability to graphically select PMD coordinates. Alternatively, PMD coordinates are provided through an automated feedback loop or programmable sequence that does not involve explicit user selection.

In step 1312, PMD coordinates are received, such as through a user selection in step 1310. In step 1314, waveplate angles are calculated that will generate the appropriate PMD spectrum defined by the preselected coordinates. In step 1316, the generator motors set the waveplate angles in accordance with the angles calculated in step 1314. Once the new waveplate angles have been set, then, in step 1318, a determination is made whether control of the PMD generator is complete. If control is not complete, the method can involve returning to step 1312 along path 1320. If, however, control is determined to be complete, the program can be terminated by moving along path 1322.

One skilled in the art will appreciate that the present invention can be practiced by other than the described embodiments. For example, FIGS. 1 and 9A make clear that the first and last phase-shifting elements of a PMD generator according to this invention are optional. This is because absence of one or both of the phase-shifting elements does not impact the PMD spectrum (although the output polarization state may be altered).

Although not wishing to be bound by any theory, Gordon and Kogelnik developed PMD concatenation rules that can be used to show why the first and last phase-shifting elements are optional (Gordon et al. "PMD Fundamentals: Polarization mode dispersion in optical fibers," Proceedings of the National Academy of Sciences, Vol. 97, No. 9, at 4541–4550 (Apr. 25, 2000)) (hereinafter, "Gordon et al."). By applying their rules to PMD generation, a simplified PMD generator can be constructed according to this invention.

Figure 14B:
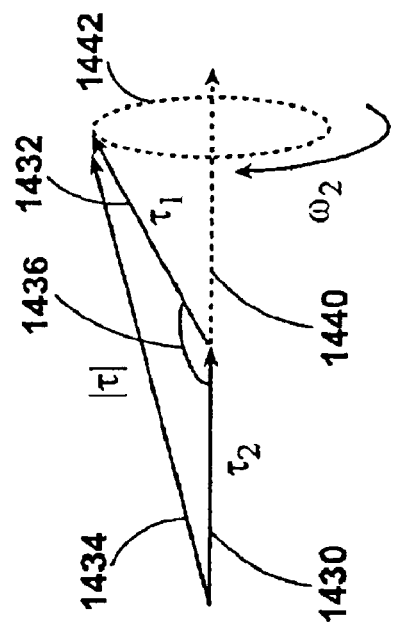
FIG. 14B shows PMD vectors, which exist in three-dimensional Stokes space, that correspond to the elements shown in FIG. 14A.
Figure 14A:
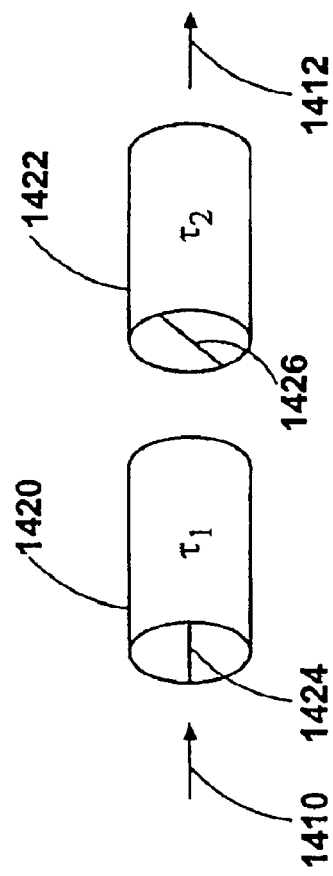
FIG. 14A shows two illustrative birefringent stages and their respective DGD values and extraordinary axis orientations according to this invention.

FIG. 14A shows illustrative birefringent stages 1420 and 1422 having respective DGD values $\tau_1$ and $\tau_2$ and extraordinary axis orientations 1424 and 1426. Stages 1420 and 1422 impart PMD on input beam 1410 to form output beam 1412. FIG. 14B shows PMD vectors 1430 and 1432, which exist in three-dimensional Stokes space, and correspond to elements 1422 and 1420, respectively.

Vector 1430 has a length proportional to $\tau_2$ and with its base fixed at a point in Stokes space. Vector 1432 has a length proportional to $\tau_1$ and has its base fixed to the tip of vector 1430. Angle 1436, which is formed between vectors 1430 and 1432 in Stokes space, is twice the angle between adjacent extraordinary axes 1424 and 1426 in physical space. Resultant PMD vector 1434 is a vector sum and has a length and a pointing direction. The length of vector 1434 is the DGD of the birefringent concatenation, and the pointing direction is collinear with the slow output principal state of polarization (hereinafter, "PSP") of the birefringent concatenation.

As explained by Gordon et al., vectors precess in Stokes space when the optical frequency changes. In fact, as frequency changes, a first PMD vector attached to the tip of a second PMD vector will precess about the axis of the second PMD vector at a rate proportional to the mathematical inverse of the second vector's corresponding DGD value. For example, vector 1432 precesses about axis 1440 (collinear with PMD vector 1430) as optical frequency changes. Thus, the tip of PMD vector 1432 traces circle 1442 in Stokes space. In all cases, the resultant DGD magnitude of the concatenation is the length of resultant PMD vector 1434. Accordingly, vector 1434 changes direction, not length, as a function of optical frequency.

FIG. 15A shows four illustrative birefringent elements 1520, 1522, 1524, and 1526 having DGD values τ1, τ2, τ3, and τ4, and extraordinary axis orientations 1530, 1532, 1534, and 1536, respectively. Four-stage concatenation of FIG. 15A can represent the four birefringent stages of a PMD generator according to this invention. FIG. 15B shows PMD vectors 1540, 1542, 1544, and 1546, which correspond to stages 1526, 1524, 1522, and 1520, respectively. Birefringent elements 1520, 1522, 1524, and 1526 are optically aligned and intersect optical beam 1510 as the beam propagates from left to right. When the beam exits last element 1526, it becomes output beam 1512 with an induced PMD spectrum.

PMD vectors 1540, 1542, 1544, and 1546 are concatenated from base 1541 of vector 1540 to tip 1547 of vector 1546. It will be appreciated that the order of vectors is opposite the order of corresponding birefringent elements as experienced by the optical beam traveling from left to right. Angle 1554 corresponds to twice the physical angular difference between adjacent extraordinary axes 1530 and 1532. Similarly, angles 1552 and 1550 correspond to twice the physical angular differences between adjacent extraordinary axes 1532 and 1534, and axes 1534 and 1536, respectively. Resultant PMD vector 1548 is the vector sum of PMD vectors 1540, 1542, 1544, and 1546 and has a length equal to the corresponding DGD magnitude and a pointing direction corresponding to the corresponding PSP.

FIG. 15B shows precession axes 1560, 1564, and 1568, collinear with PMD vectors 1544, 1542, and 1540, respectively. As explained above, as the optical frequency changes, each PMD vector precesses about its associated precession axis at a rate proportional to the DGD value of the preceding stage. For example, PMD vector 1546 precesses about precession axis 1560, tracing circle 1562 as a function of frequency if all other precessions were held fixed. Likewise, PMD vector 1544 precesses about axis 1564, thereby tracing circle 1566, and PMD vector 1542 precesses about axis 1568, thereby tracing circle 1570. The combined motion at vector tip 1547 becomes complicated, and in general, both the length and pointing direction of resultant PMD vector 1548 change with changing optical frequency.

While FIG. 15B illustrates component precessions as a function of optical frequency, it is appreciated that optical retardation also governs precession. For example, FIG. 7C illustrates the precession of polarization state 744 about Stokes axis S1 while waveplate 712 is rotated. Thus, either residual optical retardation or optical frequency effect precession.

As illustrated, any precession about first PMD vector 1546 is absent from FIG. 15B. Thus the residual optical retardation of birefringent stage 1520 does not impact the length or pointing direction of resultant PMD vector 1548. Consequently, the presence or absence of phase-shifting element 140 within birefringent stage 110 does not impact the resultant PMD spectrum of generator 100.

Figure 15C:
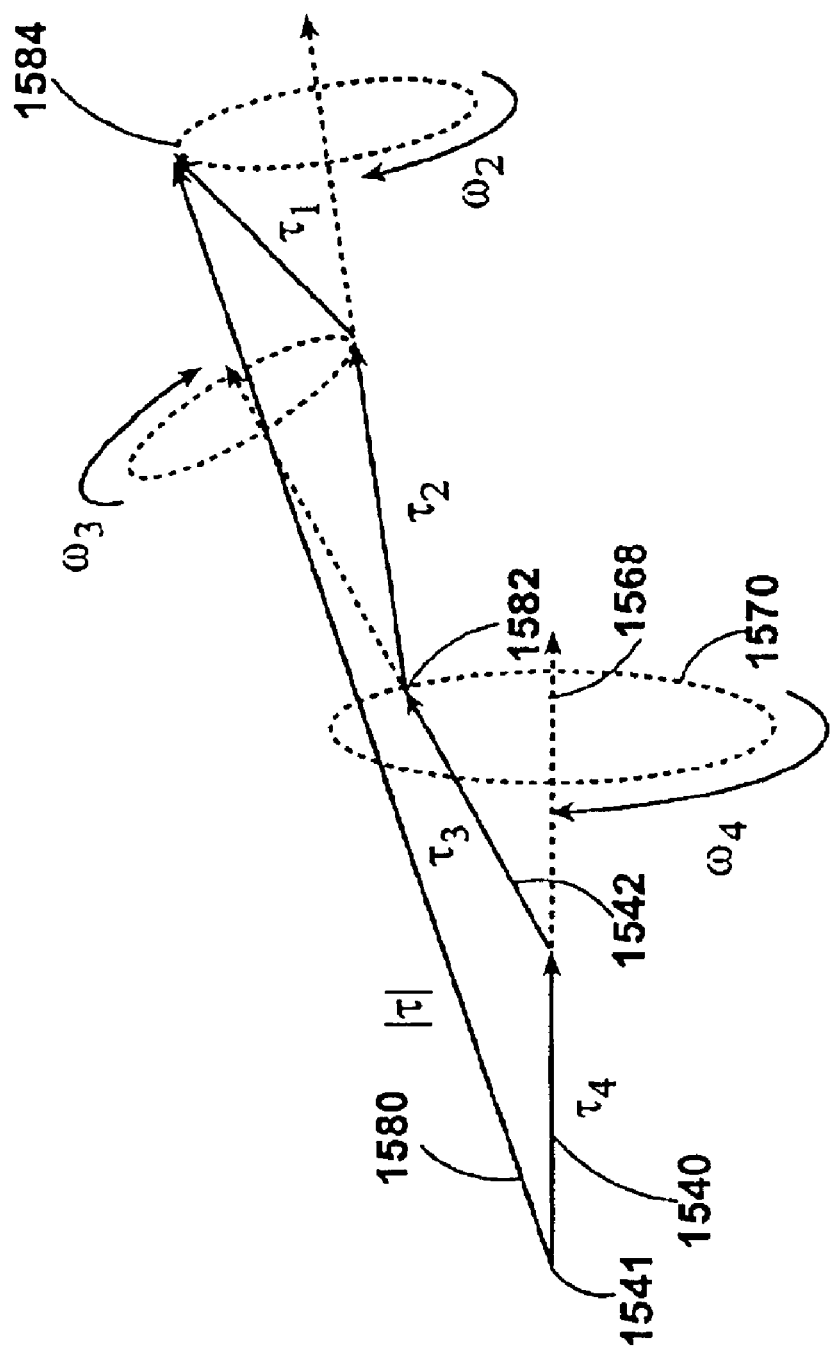
FIG. 15C shows the same PMD vectors as in FIG. 15B, but where the residual optical retardation of the last birefringent stage is changed.

FIG. 15C shows a PMD vector concatenation as in FIG. 15B, but where the residual optical retardation of birefringent stage 1526 is changed. Only birefringent stages 1522 and 1524, and by analogy stages 112 and 114 of generator 100, remain coherent (stage 1520 may or may not be coherent). As the residual optical retardation of birefringent stage 1526 changes, PMD vector 1542 precesses about axis 1568 along circular contour 1570, even for a fixed optical frequency. That is, change in either optical frequency or residual retardation induces precession.

For example, a change of residual retardation in stage 1526 rotates PMD vector 1542 out of the plane of FIG. 15C to position 1582 along circle 1570. PMD vectors 1544 and 1546 also rotate as they are attached to PMD vector 1542. Tip 1584 of resultant PMD vector 1580 no longer points in the direction of FIG. 15B.

Although the direction of vector 1580 changes, the length of resultant PMD vector 1580 (the DGD of the four-stage concatenation) does not change. Moreover, the overall DGD spectrum remains unaltered by the rotation of tip 1580 about precession axis 1568. Also, while the pointing direction of vector 1580 has changed, the shape of the PSP spectrum, the loci of pointing directions over an entire free-spectral range, remains intact—but for a net rotation of the PSP spectrum about axis 1568. Therefore, neither the PSP spectrum nor the SOPMD spectrum changes as the residual optical retardation of birefringent stage 1526 changes.

Thus, the residual optical retardation of birefringent stage 1526 does not impact the length or PSP spectral shape of resultant PMD vector 1580. Consequently, presence or absence of phase-shifting element 146 within birefringent stage 116 does not impact the resultant PMD spectrum of generator 100. Similarly, the presence or absence of phase-shifting element 140 has no impact on the PMD spectrum. The only impact of omitting first and/or last phase-shifting elements 140 and 146 is a polarization state transformation on optical beam 102 with respect to input optical beam 101.

Relaxing the coherence requirement on the first and last birefringent stages allows the DGD elements in these stages to be anharmonic. FIGS. 15B and 15C show that coherent PMD generation only requires that the DGD elements in the intermediate stages be harmonic and that the phase-shifting elements be calibrated.

Neither the residual retardation nor the DGD values of the first or last birefringent stages violate the coherence effect as taught in detail by FIGS. 17 and 18 of Damask '596, which are herein incorporated by reference.

However, it is appreciated that the range of possible PMD spectra that can be generated according to this invention will change if the first and last stages are anharmonic. For example, the DGD and SOPMD spectra shown in FIGS. 10B and 10C, as well as the contour map in FIG. 11, may need to be recalculated. Moreover, the selection of PMD coordinates made available by interface 1200 of FIG. 12 may need recalculation. Nonetheless, all such PMD spectra remain coherent as long as the intermediate birefringent stages have harmonic DGD elements and have phase-shifting or phase-compensating elements to ensure mutual coherence.

It will be appreciated that a PMD generator according to this invention can be used in a variety of ways. One way to use PMD generator is to incorporate the generator into a test instrument where PMD is controllably generated and the performance of an optical communications link can be tested. More particularly, an optical transmitter and receiver pair can be connected by an intermediate optical link. PMD is one of many effects that can impair the performance of the link, and the degree of impairment can be measured in part using a PMD generator according to this invention.

The generator can be set to a plurality of PMD states and, for each state, the link performance can be measured. When enough PMD states have been introduced, an overall performance of the link can be determined. Advantageously, a PMD generator according to this invention controllably generates DGD, PDCD, and depolarization, all three variables having impact on the link performance. The link performance can therefore be evaluated as a function of these three PMD parameters.

A PMD generator can also be incorporated into an optical PMD compensator according to this invention. An optical PMD compensator can be used to mitigate the deleterious effects of PMD as optical signals propagate along an optical fiber communications link. Typically an optical PMD compensator includes a polarization controller, an internal PMD source, an error signal generator, and a closed-loop feedback algorithm. The polarization controller can be located before the internal PMD source to transform the polarization state of the optical signal from the fiber-optic link to advantageously coincide with the PMD source. An advantage of a PMD compensator that includes a PMD generator capable of providing independent first and second order PMD control and continuous spectral frequency shifting is that compensation can be exceedingly robust and accurate. Damask '596 provides a more complete discussion of possible uses of a PMD generator in accordance with this invention.

In summary, methods and apparatus that generate DGD, depolarization, PDCD, and higher orders of PMD in a controllable and predictive manner are provided. Moreover, methods and apparatus for frequency-shifting a generated PMD spectrum while substantially retaining its shape are also provided.

It will be appreciated that the present invention can be practiced by other than the described embodiments, which are presented for purposes of illustration and not of limitation, and the present invention is limited only by the claims that follow.

What is claimed is:

1. A coherent polarization mode dispersion ("PMD") generator for generating a coherent PMD spectrum, wherein said generator comprises:
    a first birefringent stage comprising a first DGD element;
    a second birefringent stage comprising a second DGD element and a first phase-shifting element, wherein said second DGD element is harmonic;
    a third birefringent stage comprising a third DGD element and a second phase-shifting element, wherein said third DGD element is harmonic;
    a last birefringent stage comprising a last DGD element, wherein said second and third stages are between said first and last stages; and
    wherein at least two of the first, second, third, and last states have respective residual optical retardation values that are substantially the same.

2. The generator of claim 1 wherein said first stage and said last stage have a fixed phase.

3. The generator of claim 1 wherein at least one of said first and said last stages comprises a phase-shifting element.

4. The generator of claim 1 wherein at least one of said DGD elements comprises a first birefringent crystal having an extraordinary axis and a second birefringent crystal having an extraordinary axis, wherein said extraordinary axes have an orientation that is selected from a group consisting of substantially parallel and substantially perpendicular.

5. The generator of claim 1 wherein each of said DGD elements has a DOD value that is substantially the same.

6. The generator of claim 1 wherein, for each stage having a phase-shifting element, said phase-shifting element has a birefringent axis and said DGD element has an extraordinary axis, said birefringent and extraordinary axes being oriented to avoid intra-stage polarization mode-mixing.

7. The generator of claim 1 wherein at least one of said phase-shifting elements comprises at least one waveplate, said generator further comprising a phase-shift element controller that controls the angle and rotation of said waveplate.

8. The generator of claim 7 wherein said at least one waveplate comprises:
    a half wave waveplate having an input side and an output side;
    at least two quarter wave waveplates, one of said quarter wave waveplates located on said input side and one of said quarter wave waveplates on said output side.

9. The generator of claim 8 wherein said at least one phase-shifting element is calibrated using a phase-shift bias angle.

10. The generator of claim 8 wherein each of said at least two quarter wave waveplates has an e-axis, and each of said DGD elements has an e-axis, wherein said at least two quarter wave waveplates are parallel to each other, and wherein each of said at least two quarter wave waveplates' e-axis form an angle with said DGD element e-axis selected from a group consisting of substantially +45 degrees and substantially −45 degrees.

11. The generator of claim 1 wherein each of said second and third stages has a residual optical retardation that, when divided by a DGD value of its DGD element, is substantially the same.

12. The generator of claim 1 wherein each of said second and third stages has a total residual optical retardation that is an integral multiple of $\pi$.

13. The generator of claim 1 wherein each of said second and third stages' DGD elements has a DGD value that is substantially equal to an integral multiple of a unit DGD value.

14. The generator of claim 13 wherein each of said second and third stages' DGD elements has a DGD value is substantially the same.

15. The generator of claim 13 wherein said second and third DGD elements have a different DGD value.

16. The generator of claim 13 wherein said unit DGD value is substantially equal to a multiplicative inverse of a Wave Division Multiplexed ("WDM") channel spacing.

17. The generator of claim 1 wherein at least one of said phase-shifting elements includes:
    a rotary stage housing;
    a rotary motor mounted to said housing;
    a waveplate mounted on a stage that is mounted to said motor;
    a rotary motor encoder coupled to said motor; and
    an input/output cable coupled to said rotary encoder for controlling said rotary motor through said encoder.

18. The generator of claim 1 wherein said first and second stages form a first pair of adjacent stages, said second and third stages form a second pair of adjacent stages, and said third and last stages form a last pair of adjacent stages, said generator further comprising a polarization mode-mixing apparatus capable of inducing polarization mode-mixing between at least one of said pairs of adjacent stages to generate a first amount of DGD and a second amount of second order PMD ("SOPMD") independently at at least one optical frequency.

19. The generator of claim 18 further comprising a variable phase-shifting apparatus comprising a phase-shifting controller coupled to each of said phase-shifting elements.

20. The generator of claim 20 wherein said polarization mode-mixing apparatus comprises:
    at least three polarization mode-mixing elements, said elements comprising:
    a first polarization mode-mixing element between said first and second stages,
    a second polarization mode-mixing element between said second and third stages, and
    a third polarization mode-mixing element between said third and fourth stages; and
    at least two polarization mode-mixing controllers, said mode-mixing controllers comprising:

a first mode-mixing controller coupled to said first and said third mode-mixing elements, and a second mode-mixing controller coupled to said second mode-mixing element.

21. The generator of claim 20 wherein each of said stages has a birefringent axis, and wherein said first and second stages form a first pair of stages, said second and third stages form a second pair of stages, and said third and last stages form a last pair of stages, and each of said pairs includes a first adjacent stage and a second adjacent stage, wherein said first adjacent stage birefringent axis and said second adjacent stage birefringent axis is either substantially parallel or substantially perpendicular to each other.

22. The generator of claim 21 wherein at least one of said mode-mixing elements comprises an electro-optic element.

23. The generator of claim 22 wherein said electro-optic element has a principal axis and each of said first and second adjacent stages has a birefringent axis, and wherein said principal axis is not substantially parallel nor substantially perpendicular to either of said birefringent axes of said first and second adjacent stages.

24. The generator of claim 23 wherein said principal axis and said birefringent axes of said first and second adjacent stages are at an angle that is about 45 degrees.

25. The generator of claim 21 wherein said polarization mode-mixing apparatus can at least rotate said first adjacent stage relative to said second adjacent stage.

26. The generator of claim 20 wherein at least one of said mode-mixing elements comprises at least one waveplate.

27. The generator of claim 26 wherein said at least one waveplate comprises a half-wave waveplate.

28. The generator of claim 27 wherein said half-wave waveplate is rotatable about a beam propagation axis.

29. The generator of claim 26 wherein at least one of said mode-mixing controllers comprises a waveplate controller for controlling rotation of said at least one waveplate.

30. The generator of claim 29 wherein, for each of said stages having a phase-shifting element, said DGD element has a retardation error and said phase-shifting element has a compensating retardation such that said total retardation of said stage is said integral multiple of $\pi$.

31. The generator of claim 18 wherein said coherent PMD spectrum comprises a DGD spectrum that has Fourier component frequencies that are in phase.

32. The generator of claim 31 wherein said DGD spectrum is aligned to a comb of WDM signals.

33. The generator of claim 31 wherein said Fourier component frequencies have a common Fourier-component frequency denominator.

34. The generator of claim 18 wherein said coherent PMD spectrum comprises a DGD spectrum that has sinusoidal Fourier components that are all aligned in phase and share an optical frequency where all the sinusoidal components are either at a maximum or at a minimum.

35. The generator of claim 18 wherein said PMD generator is restricted to operate along a predetermined DGD/SOPMD trajectory.

36. The generator of claim 35 wherein said predetermined trajectory is selected from a group consisting of a constant DGD trajectory, a constant SOPMD trajectory, a fixed rate of change of a DGD trajectory, a fixed rate of change of a SOPMD trajectory, and any combination thereof.

37. The generator of claim 35 wherein each of said DGD and SOPMD at said optical frequency can vary within a DGD/SOPMD space in which said DGD and said SOPMD only vary monotonically between zero and a respective maximum.

38. The generator of claim 18 wherein said at least one optical frequency is a plurality of optical frequencies.

39. The generator of claim 38 wherein said plurality of optical frequencies is a set of WDM channel frequencies, and wherein said first and second amounts are substantially the same at each of said channel frequencies.

40. The generator of claim 18 further comprising:

a first mode-mixing controller for varying a first degree of mode-mixing between said first and second stages and for varying said first degree of mode-mixing between said third and last stages; and a second mode-mixing controller for varying a second degree of mode-mixing between said second and third stages.

41. The generator of claim 40 wherein said controllers are programmed to vary said PMD spectrum by changing said first and second degrees of mode-mixing such that said first amount is substantially fixed while said second amount varies.

42. The generator of claim 40 wherein said controllers are programmed to vary said PMD spectrum by changing said first and second degrees of mode-mixing such that said second amount of SOPMD is substantially fixed while said first amount varies.

43. The generator of claim 40 wherein said controllers are programmed to vary said PMD spectrum by changing the first and second degrees of mode-mixing such that said second amount of SOPMD changes at a predetermined rate while said first amount varies.

44. The generator of claim 40 wherein each of said controllers induce sufficient polarization mode-mixing between a respective pair of adjacent stages such that said second amount changes from a first SOPMD state to a second SOPMD state, without substantially varying said first amount, by moving along a constant DGD contour.

45. The generator of claim 44 wherein said constant DGD contour can be determined substantially as follows:

$$\tau_o = 4\tau |\cos(PM1)| \times |\cos(PM2-PM1)|$$

where $\tau_o$ is the first amount of DGD, $\tau$ is a DGD value of a birefringent stage, PM1 is the first degree of mode-mixing, and PM2 is the second degree of mode-mixing.

46. The generator of claim 40 wherein said controllers induce sufficient polarization mode-mixing between pairs of adjacent stages such that said first amount changes from a first DGD state to a second DGD state without varying said second amount of SOPMD by moving along a constant SOPMD contour.

47. The generator of claim 46 wherein said constant SOPMD contour can be determined substantially as follows:

$$|\tau_w| = \tau^2 \times \sqrt{(\tau_{1w}^2 + \tau_{2w}^2 + \tau_{3w}^2)},$$

where $$\tau_{1w} = 0,$$

$$\tau_{2w} = 0, \text{ and}$$

$$\tau_{3w} = 2\sin(PM1)\cos(PM1)\sin^2(PM2/2) + 4\cos(PM1)\cos^2(PM1/2)\sin(PM2) - 2\sin(PM1)\cos^2(PM2/2)(2+\cos(PM1))$$

and where $|\tau_w|$ is the second amount of SOPMD at said optical frequency, $\tau$ is a DGD value of a birefringent stage, PM1 is the first degree of mode-mixing, and PM2 is the second degree of mode-mixing.

48. The generator of claim 40 wherein said degrees of mode-mixing between stages can vary within certain limits such that all constant SOPMD contours within said limits change monotonically.

49. The generator of claim 1 further comprising a variable phase-shifting apparatus comprising a phase-shifting controller coupled to each of said phase-shifting elements.

50. The generator of claim 49 wherein said phase-shifting apparatus comprises at least one phase-shifting bias unit coupled to each of said phase-shifting elements.

51. The generator of claim 50 wherein said first and last stages further comprise a phase-shifting element.

52. The generator of claim 50 wherein each said bias unit can provide a respective phase-shift bias angle that corresponds to a zero residual retardation for a respective stage.

* * * * *